Sept. 1, 1964  F. BUCHSBAUM ETAL  3,146,702
PRINTER FOR DATA PROCESSING APPARATUS
Filed Nov. 20, 1961  17 Sheets-Sheet 1

INVENTORS
FRANK BUCHSBAUM
WARD G. LEATHERS
BY THOMAS S. HARRIS

Curtis, Morris & Safford
ATTORNEYS

INVENTORS
FRANK BUCHSBAUM
WARD G. LEATHERS
THOMAS S. HARRIS
BY
*Curtis, Morris & Safford*
ATTORNEYS Sept. 1, 1964  F. BUCHSBAUM ETAL  3,146,702
PRINTER FOR DATA PROCESSING APPARATUS
Filed Nov. 20, 1961  17 Sheets-Sheet 4

INVENTORS
FRANK BUCHSBAUM
WARD G. LEATHERS
THOMAS S. HARRIS
BY
ATTORNEYS

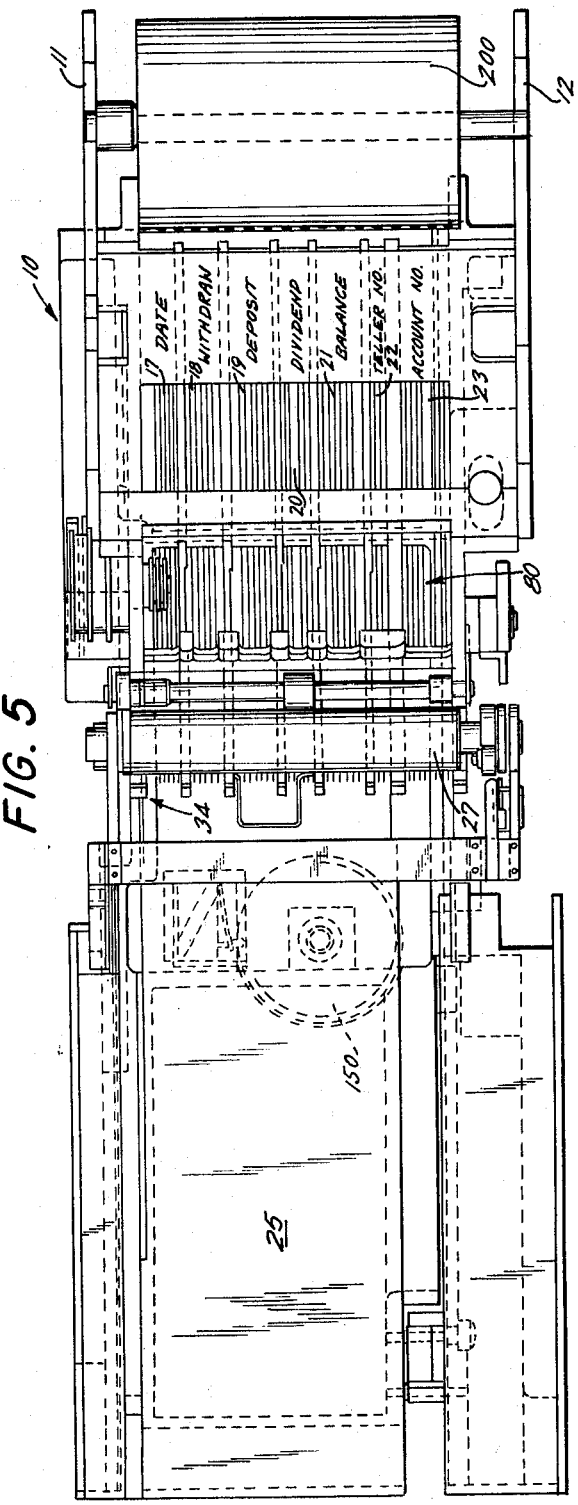

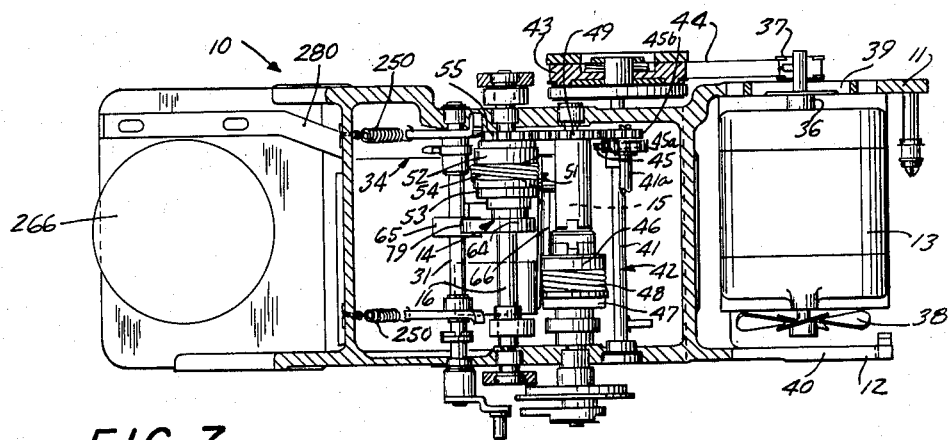
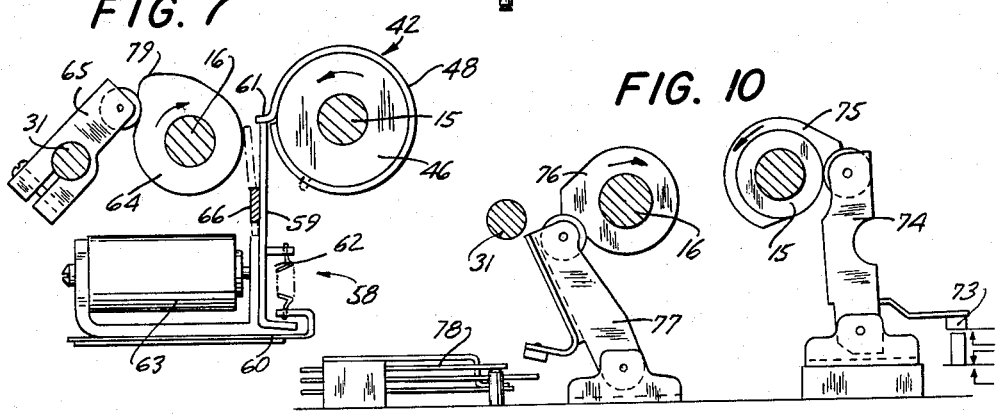
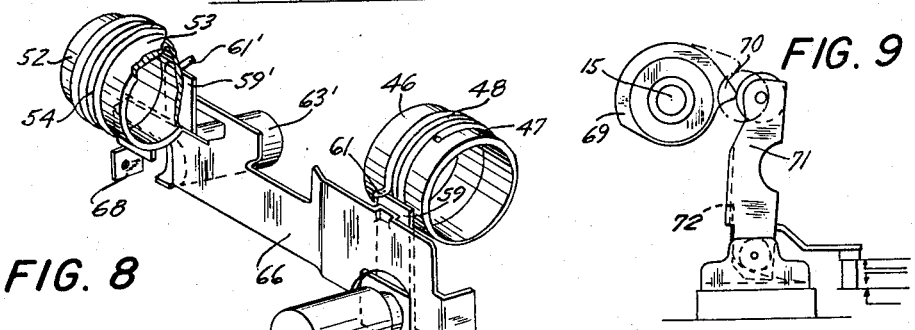

INVENTORS
FRANK BUCHSBAUM
WARD G. LEATHERS
THOMAS S. HARRIS

BY Curtis, Morris & Safford
ATTORNEYS

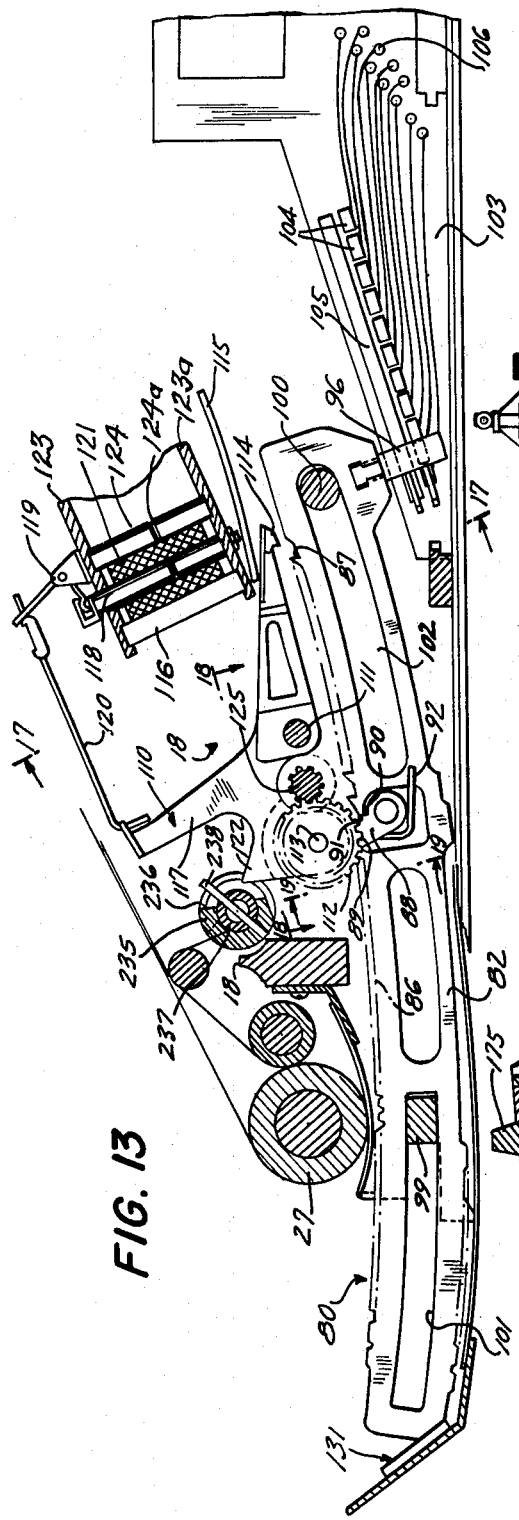

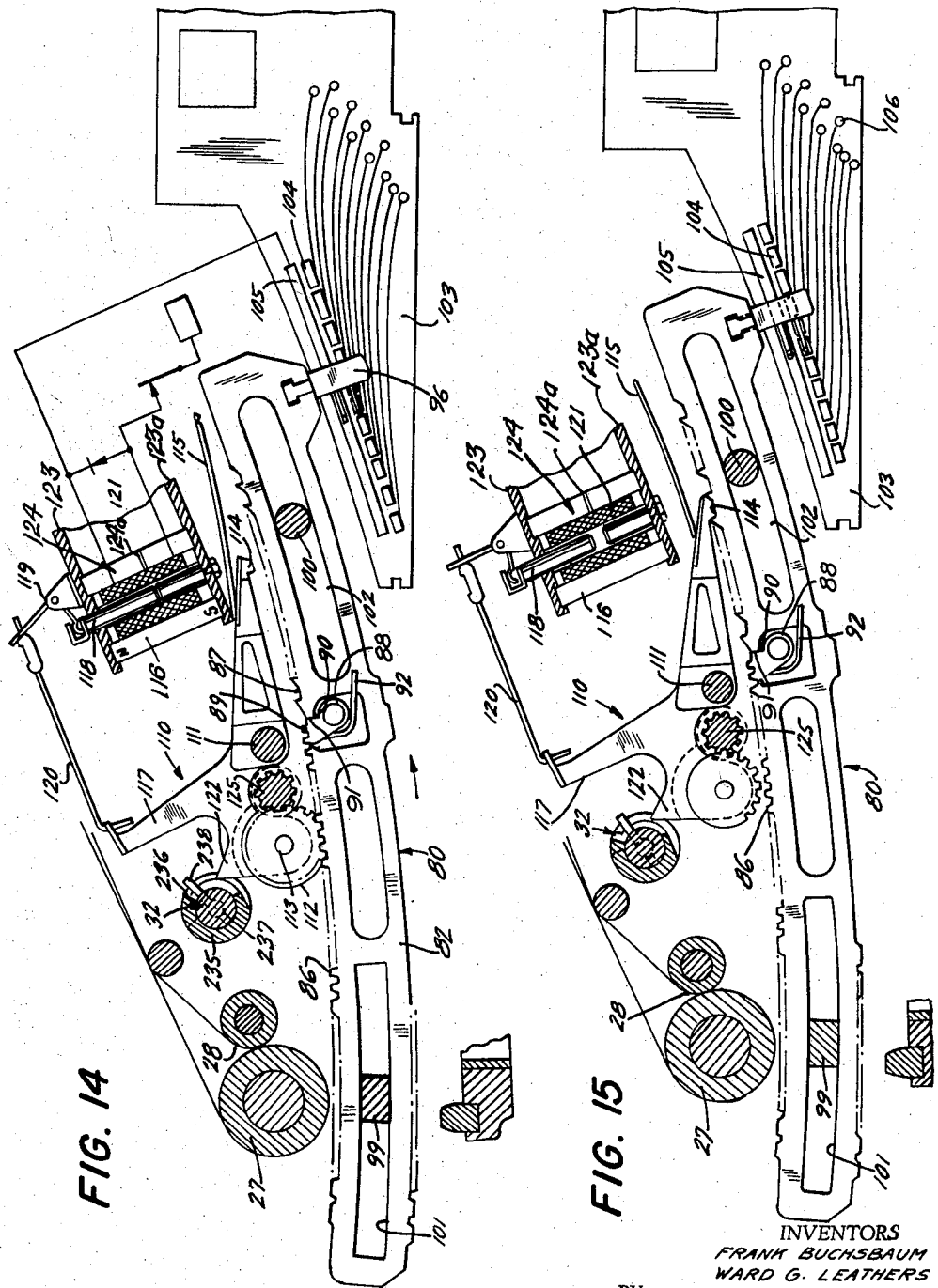

Sept. 1, 1964 F. BUCHSBAUM ETAL 3,146,702
PRINTER FOR DATA PROCESSING APPARATUS
Filed Nov. 20, 1961 17 Sheets-Sheet 10

INVENTORS
FRANK BUCHSBAUM
WARD G. LEATHERS
THOMAS S. HARRIS
BY
Curtis, Morris & Safford
ATTORNEYS

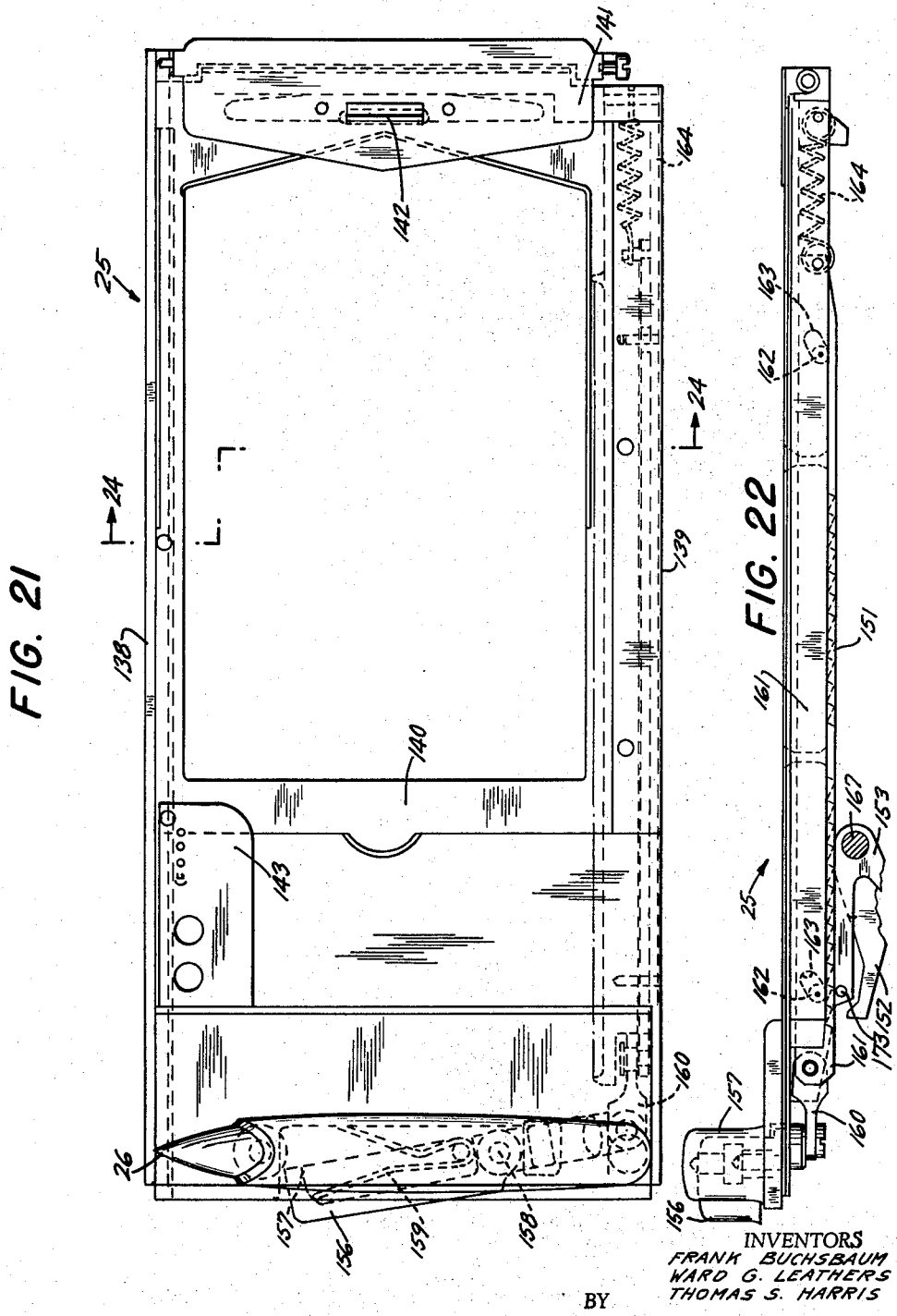

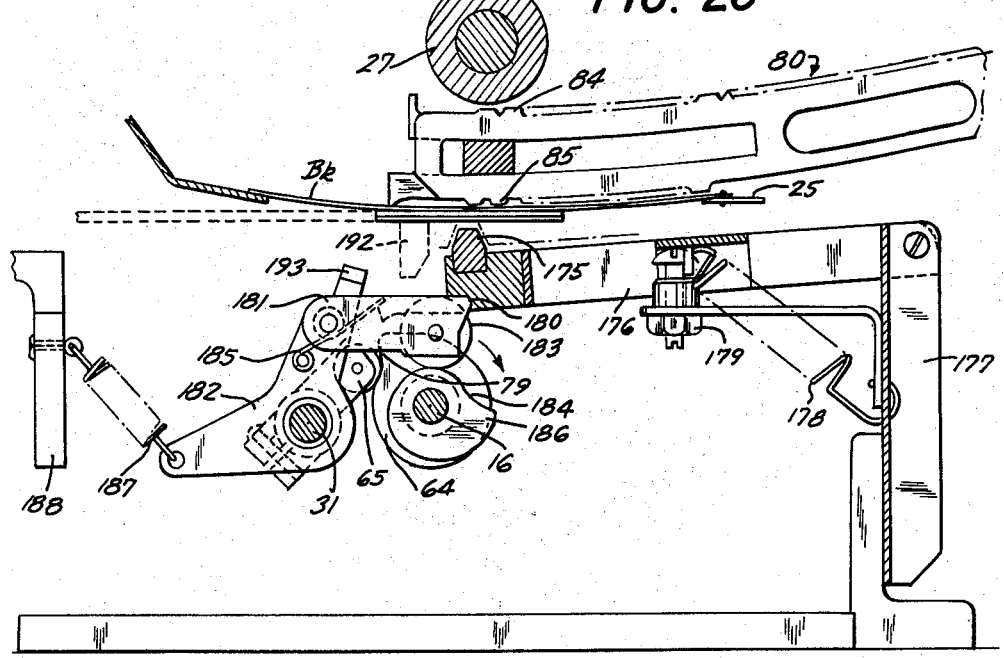
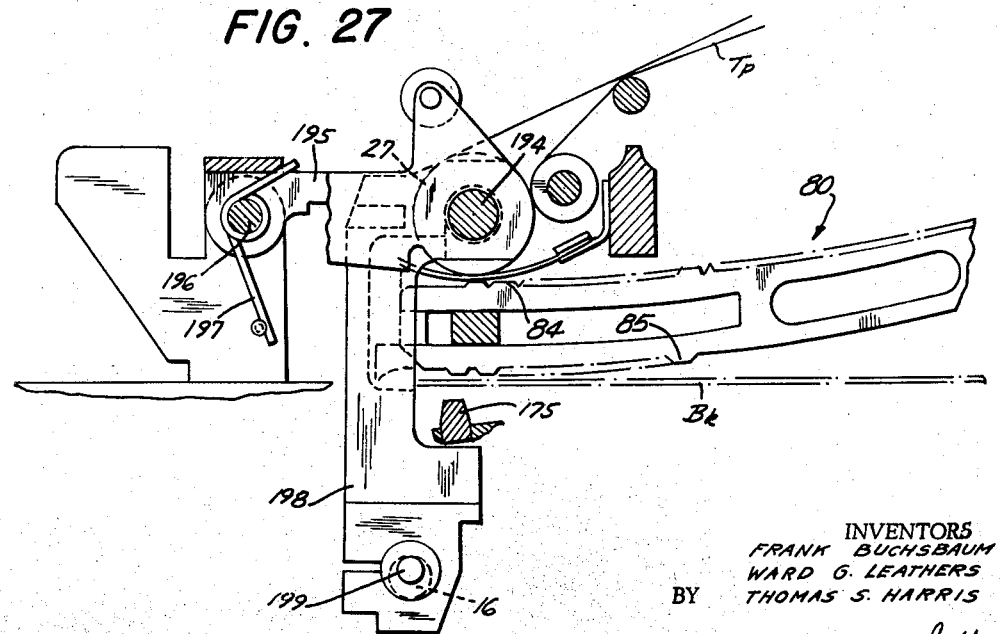

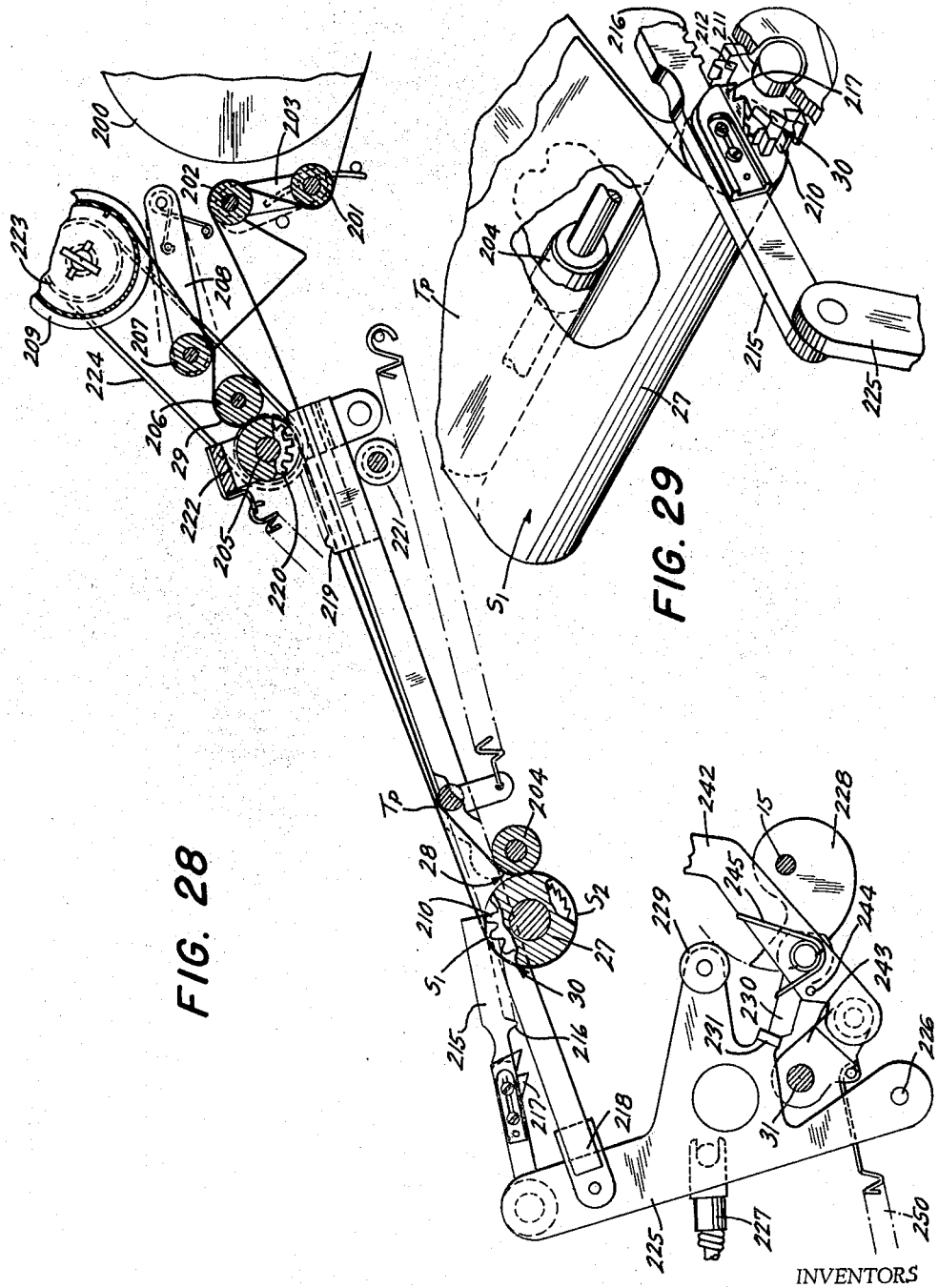

INVENTORS
FRANK BUCHSBAUM
WARD G. LEATHERS
THOMAS S. HARRIS
BY
Curtis Morris + Safford
ATTORNEYS

INVENTORS
FRANK BUCHSBAUM
WARD G. LEATHERS
THOMAS S. HARRIS
BY

ATTORNEYS

Sept. 1, 1964   F. BUCHSBAUM ETAL   3,146,702
PRINTER FOR DATA PROCESSING APPARATUS
Filed Nov. 20, 1961   17 Sheets-Sheet 16

INVENTORS
FRANK BUCHSBAUM
WARD G. LEATHERS
BY THOMAS S. HARRIS

Curtis, Morris & Safford
ATTORNEYS

Sept. 1, 1964  F. BUCHSBAUM ETAL  3,146,702
PRINTER FOR DATA PROCESSING APPARATUS
Filed Nov. 20, 1961  17 Sheets-Sheet 17

INVENTORS
FRANK BUCHSBAUM
WARD G. LEATHER
BY THOMAS S. HARRIS

*Curtis, Morris & Safford*
ATTORNEYS

United States Patent Office 3,146,702
Patented Sept. 1, 1964

3,146,702
PRINTER FOR DATA PROCESSING APPARATUS
Frank Buchsbaum, Flushing, and Ward G. Leathers, Massapequa, N.Y., and Thomas S. Harris, Stamford, Conn., assignors to The Teleregister Corporation, Stamford, Conn., a corporation of Delaware
Filed Nov. 20, 1961, Ser. No. 153,667
23 Claims. (Cl. 101—93)

The present invention relates to a perpetual inventory system and more particularly to a printer for use in a bank to print a record of all changes made in customer accounts.

It is a conventional practice in banking institutions to supply each depositor with a bank book and to retain a corresponding book or other record sheet in the bank files. Each time a customer deposits or withdraws money an entry is made in the depositer's book as well as on the corresponding bank record of the amount and the new balance. Also, any interest which has been earned is calculated at the end of the interest period and an entry of the amount and new total is made in the customer's book and on the bank record. These entries may be written in the customer's book and bank record by the bank teller, or the book and record may be inserted in a business machine which will calculate new totals and print the information on the record.

Data processing equipment is now available which together with a memory storage may be used to maintain a perpetual inventory of different items, such as the customer accounts in a bank, and provides many advantages over previously used accounting systems. For example, the data processing equipment can maintain a large number of accounts in a relatively small space, calculate interest, add or subtract deposits and withdrawals and produce a new balance at an extremely rapid rate without errors, adapt a number of branch banks to be serviced from one source and provide any information for the entire banking operation almost instantly. However, the customer has become accustomed to having a book in which all transactions are recorded as a receipt, and to meet this customer requirement the data processing system must be capable of supplying the depositor with a printed record of his account after each transaction.

One of the objects of the present invention is to provide an improved printer adapted to be operated automatically by electric signals from a source, such as a data processing unit, located remotely from the printer.

Another object is to provide a printer of the type indicated for printing on a bank book all amounts deposited and withdrawn and interest accumulated as well as the new total of any selected one of a plurality of bank accounts stored in the memory of a data processing unit.

Another object is to provide a printer of the type indicated which is adapted to print the same indicia on the flat surface of a bank book and a continuous record tape located at different places therein.

Another object is to provide a printer of the type indicated which is adapted to position a particular line of a record sheet at a printing station and automatically advance the record sheet one line after each printing operation.

Another object is to provide a printer of the type indicated in which a continuous record tape is moved from a station where it can be observed to a printing station immediately preceding a printing operation and then back to the first station immediately after printing.

Another object is to provide a printer with type bars of improved construction to adapt them to be moved relative to each other and locked in adjusted position for a printing operation.

Another object is to provide a printer of the type indicated in which a plurality of type bars are simultaneously moved to adjusted position by the same driving element.

Another object is to provide a printer of the type indicated in which a plurality of type bars are released simultaneously after each printing operation has been completed.

Another object is to provide a printer of the type indicated in which all of the type bars except those for printing a balance are released by operation of the printer and the balance type bars are released in response to a signal independently of the other bars.

Another object is to provide an interlocking arrangement for preventing a printing operation until the type bars have been adjusted and a record sheet is properly positioned in the printer and preventing adjustment of type bars during a printing operation.

Still another object is to provide a printer of the type indicated which is of relatively simple and compact construction, operable at a relatively high speed and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 5 is a plan view of the printer showing the different groups of type bars for printing different items of information;

FIGURE 6 is a sectional plan view showing the driving mechanism for the printer;

FIGURE 7 is a transverse sectional view through the selection and print shafts to show the magnetic operator for one of the clutches;

FIGURE 8 is a perspective view to show the interlock bar between the clutches for the selection and print shafts to prevent operation of either one of the shafts when the other is operating;

FIGURE 9 is a side elevational view of a shaft positioning mechanism to insure release of the clutch;

FIGURE 10 is a transverse sectional view showing switch means operated by each shaft at the completion of one revolution;

FIGURE 13 is a sectional view similar to FIGURE 12 and showing the type bars moved to a first position against a stop;

FIGURE 14 is a view similar to FIGURE 13 showing the type bars moved to adjusted position;

FIGURE 15 is a view similar to FIGURE 14 showing the manner in which the pivoted control lever for each bar is rocked from a driving to a locking position;

FIGURE 16 is a perspective view of the gearing for manually adjusting the plurality of type bars of one group to indicate a particular date;

FIGURE 17 is a transverse sectional view taken on line 17—17 of FIGURE 13 to show the electric switch plate between each adjacent pair of type bars and the brushes on adjacent bars engaging the contacts on opposite sides of the switch plate;

FIGURE 18 is a sectional plan view taken on line 18—18 of FIGURE 13 to show the gear mounted on each control lever for transmitting motion of a drive shaft to a type bar;

FIGURE 19 is a sectional view taken on line 19—19 of FIGURE 13 to show the meshing engagement of the gear on the control lever with the rack teeth on the type bar in end elevation;

FIGURE 20 is a perspective view of the carriage for mounting a bank book to be printed;

FIGURE 21 is a plan view of the carriage showing the manually operable latching means for releasing the carriage for movement in the printer;

FIGURE 22 is a side elevational view of the carriage illustrated in FIGURE 21 and showing the latch plate for releasing the pawls from engagement with the ratchet teeth on the carriage;

FIGURE 23 is an end view of the carriage and showing the depending side rails of the carriage mounted to slide in grooved tracks in the printer frame;

FIGURE 24 is a transverse sectional view taken on line 24—24 of FIGURE 21 to show the rack on one of the depending rails of the carriage and engaged by teeth on a spring actuated drum to move the carriage forwardly;

FIGURE 25 is a side elevational view of a portion of the carriage and showing the offset pawls operated successively by cams on the bail shaft for advancing the carriage one line after each printing operation;

FIGURE 26 is a longitudinal sectional view through the printing station to show the mechanism for operating the lower platen to print on the bank book;

FIGURE 27 is a side elevational view to show the reciprocating frame at the printing station for operating the upper platen to print on the record proof tape;

FIGURE 28 is a longitudinal sectional view showing the feed mechanism for operating the record proof tape;

FIGURE 29 is a detail view of the gainer mechanism for moving the proof tape one line after each printing operation;

System and Printer in General

Figure 1:
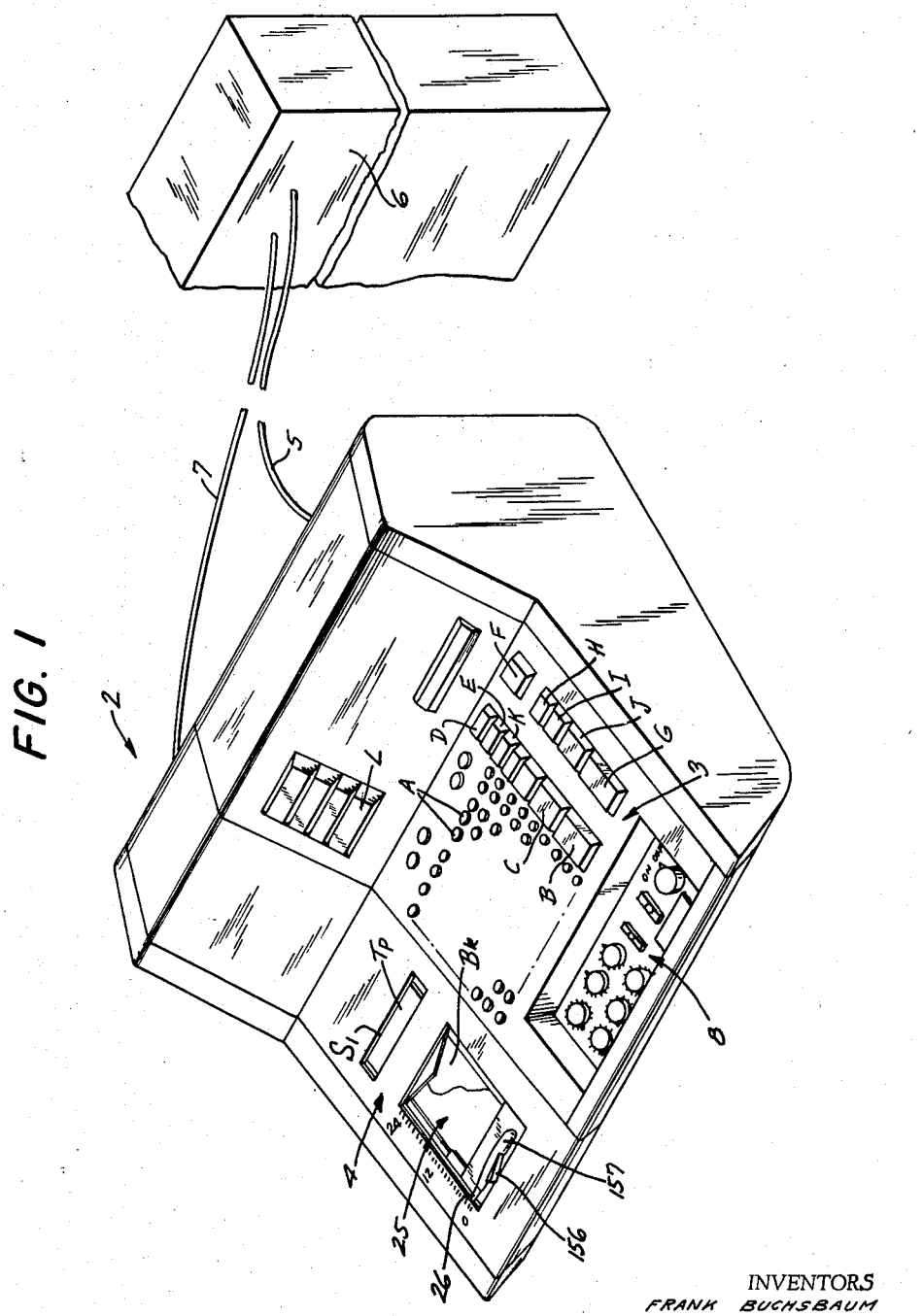
FIGURE 1 is a perspective view of an accounting system incorporating the novel features of the present invention and showing the combined keyboard and printer unit used by each teller in a bank and its connection with a data processing unit.

In general, the system comprises a unit, as shown in FIGURE 1, having a key set illustrated as a keyboard 3 and printer 4 arranged in side by side relation. While the system and printer of the present invention may have other applications for keeping a perpetual inventory of a number of items, it is particularly adapted for use in a bank for processing the accounts of all of its customers. When the system is to be used in a bank, a unit 2 is provided for each teller in a particular bank building, or in a plurality of banking operations located in separate buildings. The keyboard 3 of each unit 2 is connected by a cable 5 to a remotely located data processing unit 6 and the data processing unit, in turn, is connected to the printer 4 by a cable 7. For example, the data processing unit 6 may be located in the same building with a plurality of teller units 4 or may serve teller units 2 in a plurality of branch banks in the same city or state, or even serve units in different states.

The data processing unit 6 may be of any suitable kind having a memory storage either in the form of a magnetic drum or magnetic tape for storing information. The memory storage may be so arranged as to maintain a perpetual inventory of different items in a readily available manner, such as all of the customer accounts of a central bank and all of its branches. The data processing unit 6 is adapted to receive and transmit information, add to and subtract from a previous balance and indicate a new balance all in the form of coded electric signals. In a savings bank operation the data processing unit 6 adds new deposits and interests to or subtracts withdrawals from the balance as instructed by a teller on the keyboard 3 of his unit 2, and then prints the amount deposited or withdrawn and the new balance in the customer's bank book and also on a record tape in the printer.

More specifically when a customer requests a particular transaction he delivers his bank book Bk to the teller. The teller may request information, such as the status of the account, by punching the particular account number on keys A of the keyboard 3 and depressing a button B which transmits signals through cable 5 to the data processing unit 6. Button B instructs the data processing unit 6 to indicate the status of the particular account indicated by the number punched on the keypunches 3. In accordance with instructions, data processing unit 6 then scans the memory to determine the balance in the particular account and transmits the information by signals through the cable 7 to the printer 4. The printer 4 utilizes the signals to print the information on a record tape Tp where it can be observed by the teller. The teller then compares the balance on the record tape Tp with the balance indicated on the bank book Bk. If the two balances tally, the teller then inserts the book Bk in the printer and initiates the particular transaction requested by the customer.

For example, if money is to be deposited, the amount is punched on the keys A and a button C pressed requesting that the amount be deposited to the particular account. The information is transmitted through the cable 5 which instructs the data processing unit 6 to add the amount to the particular account. The data processing unit 6 then adds the amount and transmits a coded signal of the amount back through cable 7 to printer 4 and the amount deposited as set on the keys A and new balance are printed simultaneously on the bank book Bk and proof tape Tp. Interest is computed automatically at the end of each interest period, added to the balance and the information stored in the memory of the data processing unit 6 for subsequent printing in the customer's bank book Bk. If interest has not been credited in bank book Bk a light L will come on when the account is queried. Thus, the balance will be larger than that indicated in the book by the amount of the interest. To add the interest in the customer's book an interest button E is depressed which operates to print the amount of interest and thereafter print the new balance. As the interest call is not preceded by any signal to clear the balance, the balance is maintained for updating the customer's bank book with accrued interest. When desired, a sub total only is printed by depressing button D. Similarly, a button F is provided for withdrawals which operates in the same way as deposits. Other buttons are provided for other purposes and for use in other perpetual inventory systems. For example, a button G may be provided to initiate operation, H to print only, I to correct, J for proof and K to clear the particular unit, among others. In addition, knobs are provided in the normally closed section 8 of the keyboard 3 which may be set by a supervisor to indicate a particular branch and a particular teller. After this information has been set the section 8 is closed and locked.

The printer 4, as shown in FIGURES 1 to 6, comprises a frame 10 having spaced side plates 11 and 12, see FIGURES 5 and 6. A motor 13 is mounted between the side plates 11 and 12 of frame 10 and is initiated by a signal from the data processing unit 6. Motor 13 is connected through driving mechanism 14, later to be described in detail, to drive a selection shaft 15 and print shaft 16 alternately in succession. A series of groups of type bars 17 to 23, see FIGURE 5, are provided which extend longitudinally of the machine above the transverse selection and print shafts 15 and 16. Each of the groups 17 to 23 of type bar are adapted to print particular information. For example, the type bars of group 17 are manually set to print a particular date and the remaining groups are automatically set by signals from the data processing unit 6. In the illustrated embodiment, group 18 is adapted to print withdrawals, group 19 deposits, group 20 interest, group 21 a balance, group 22 the teller number and group 23 the account number, but in other systems a different arrangement of type bars might be used. The selector shaft 15 operates through gearing to move the individual type bars of all of the groups 17 to 23 to adjusted positions in accordance with instructions from the data processing unit 6 and each type bar has brushes successively engaging contacts of a selective switch for controlling the position of adjustment of the bar.

Before a printing operation is initiated the customer's bank book B$k$ is placed on a carriage 25, see FIGURE 1, and moved manually by the teller to position the next free line of the book in position to be printed, as shown by the indicator 26 at the side of the carriage.

After the type bars have been moved to adjusted position by the selection shaft 15, this shaft is disconnected and the print shaft 16 operated to print the information as instructed by the teller. The arrangement is such that each type bar has corresponding type characters at its opposite upper and lower edges and the bars are curved so that the type characters will print through a ribbon 33 onto the record tape T$p$ and bank book B$k$. The tape extends around a cylindrical platen 27, see FIGURES 2 and 4, and the platen is moved toward the type bars to make the impression.

Figure 2:
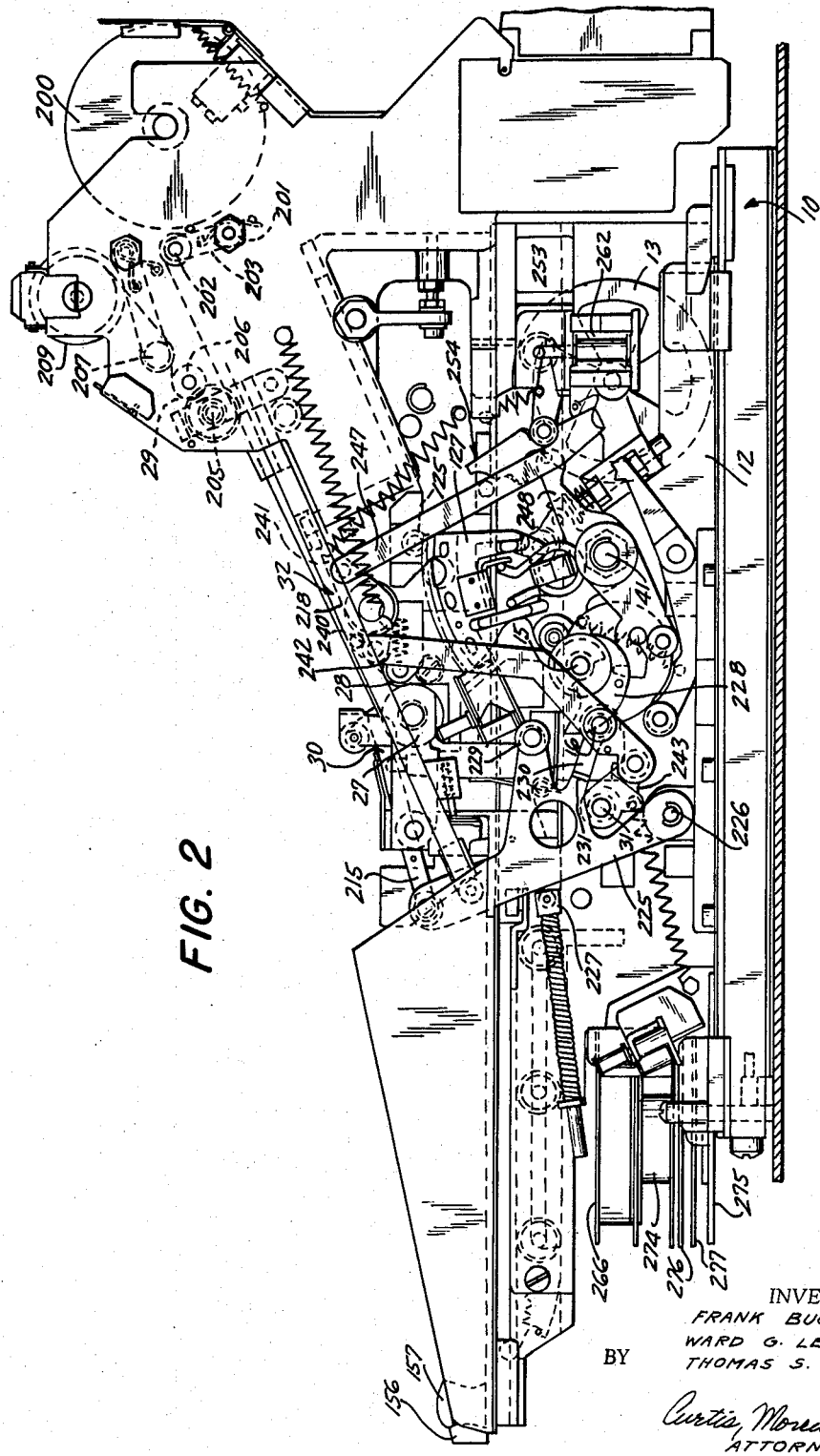
FIGURE 2 is a side elevational view of one side of the printer and showing the driving mechanisms for operating different elements.
Figure 3:
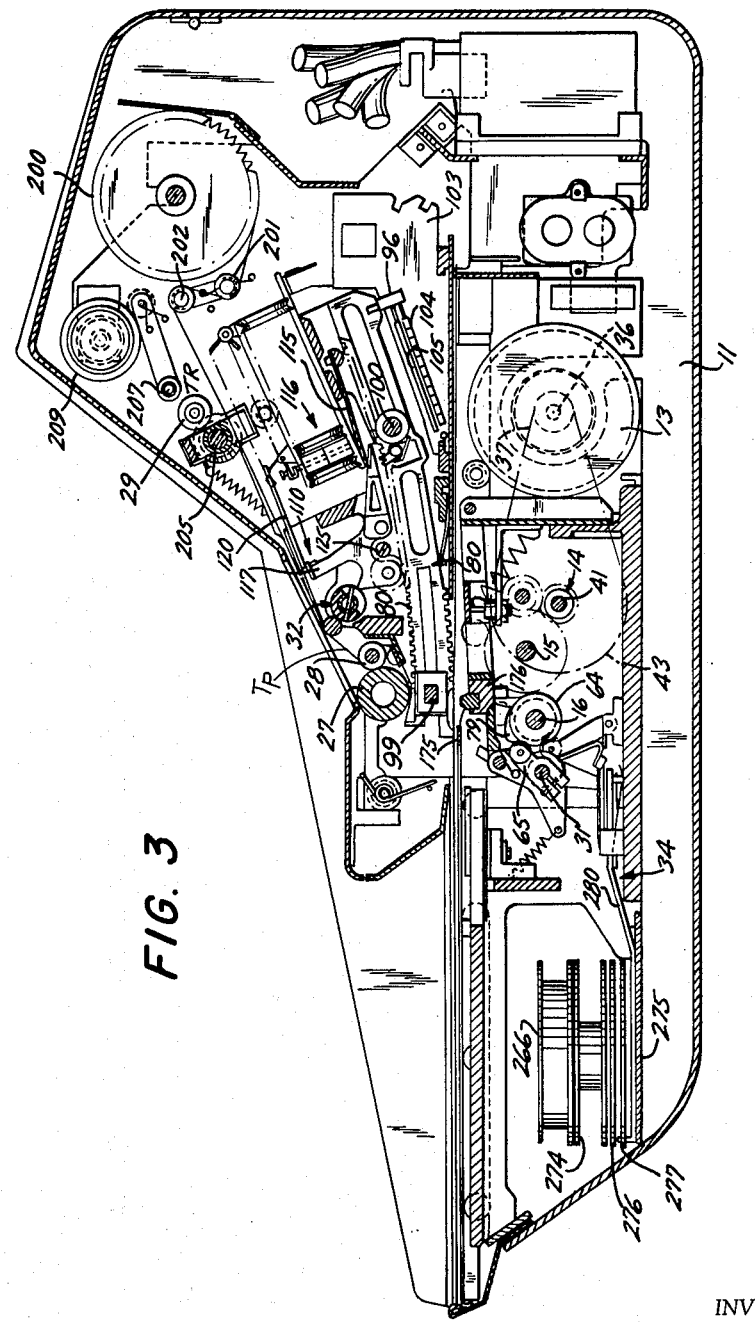
FIGURE 3 is a longitudinal sectional view of the machine from the same side illustrated in FIGURE 2 and showing the form of the type bars and their relationship to the book and tape to be printed at opposite sides thereof.

The tape is printed at the bottom of the platen 27 so that the information cannot be observed by the teller. To make the information available to the teller, paper driving mechanisms 28 and 29, see FIGURES 2, 3 and 28, are provided which move the tape from a location under the platen 27 to a location at the top of the platen. The driving mechanism 28 controls the motion of tape T$p$ in both directions to and from a printing position and the driving mechanism 29 moves the tape to take up slack between the drive 28 and a take up reel to properly position printed indicia in the observation window where it may be observed by the teller. A gainer mechanism 30 is provided which cooperates with the driving mechanism 28 to move the tape back a distance less than it is advanced by an amount equal to one space.

The print shaft 16 oscillates a bail shaft 31, see FIGURES 3 and 6, adjacent the end of its cycle which operates through suitable linkage to operate a bail 32 which unlocks the print bars from their adjusted position and connects them for operation by the selection shaft for the next transaction. The bail shaft 31 also operates through other mechanism to reset various elements.

A single ribbon 33 serves to print on both the bank book and record tape and a driving mechanism 34 operated by the bail shaft 31 advances the ribbon after each printing operation.

Driving Mechanism

The driving mechanism 14, shown in detail in FIGURE 6, comprises the electric motor 13 mounted between the side plates 11 and 12 of the frame 10 and constituting the prime mover for the entire printer. One end of the motor shaft 36 projects beyond the side plate 11 and mounts a driving pulley 37. The opposite extended end of the motor shaft 36 mounts a fan 38 for circulating air through openings 39 and 40 in the side frames 11 and 12 to cool the motor. In addition to the motor 13, the driving mechanism 14 includes a driven shaft 41, a countershaft 41$a$, the selection and print shafts 15 and 16 and bail shaft 31.

The driven shaft 41 is mounted in suitable bearings in the side plates 11 and 12 of the frame 10 and mounts a pulley 43 on its projected end in alignment with the driving pulley 37 on motor 13. Pulleys 37 and 43 are shown connected by a belt 44. Driven shaft 41 also mounts a spur gear 45 for meshing engagement with a spur gear 45$a$ on shaft 41$a$. Shaft 41$a$, in turn, mounts a spur gear 45$b$ which meshes with the spur gear 49 on selection shaft 15. Motor 13 rotates continuously when once initiated and operating through the driving pulley 37, belt 44 and driven pulley 43 continuously rotates the idler shaft 41. Selection shaft 15 also is mounted to rotate in suitable bearings in side plates 11 and 12 of the frame and its operation is controlled by a clutch 42. Clutch 42 has separate sleeves 46 and 47 mounted on shaft 15 in end to end relationship and sleeve 47 is fast on the shaft. A spring 48 has one end connected to sleeve 47 and its opposite end is adapted to wrap around the other sleeve 46 to connect the sleeves to each other for rotation as a unit. Sleeve 46 fixedly mounts spur gear 49 in meshing engagement with the spur gear 45$b$ on the countershaft shaft 41$a$. Thus, when the spring 48 is released, it automatically wraps around the sleeve 46 to drive the selection shaft 15 from the motor 13, but when the free end of the spring is held to uncoil the spring, the sleeve 46 rotates freely relative to the sleeve 47.

The print shaft 16 is similar to the selection shaft 15 and has a similar clutch with a driving sleeve 52, a driven sleeve 53 fast on the print shaft and a spring clutch element 54. The driving sleeve 52 has a spur gear 55 in meshing engagement with the spur gear 49 of the clutch 46 for the selection shaft 15, so that the driving sleeve is continuously rotated. When the spring 54 is released, it connects the driving sleeve 52 and driven sleeve 53 for rotation as a unit to drive the print shaft 16, and when the spring is uncoiled it disconnects the sleeve of the clutch.

Both of the clutch controls are identical but arranged in reverse order. One of the clutch controls 58 is illustrated in detail in FIGURE 7 as comprising an arm 59 mounted to rock on a base 60 and having an upper end underlying a laterally projecting end 61 of the spring 48 of clutch 42 surrounding its driving sleeve 46, for example. The arm 59 is rocked to a clutch releasing position by a spring 62 acting between a pin projecting from the arm and a lug projecting from the base 60. Arm 59 is rocked to a clutch engaging position, in which the spring is released, as illustrated by dotted lines in FIGURE 7, by a solenoid 63 mounted on the base 60. When the arm 59 is rocked to spring releasing position by the solenoid 63 against the action of the spring 62, the spring clutch element 48 operates to connect the driving sleeve 46 with the driven sleeve 47 and rotates the selection shaft 15. The clutch 51 for print shaft 16 is operated in the same way, and for purposes of description, the control arm and solenoid for the clutch spring 54 is identified as 59′ and 63′, respectively, and the end of the clutch spring is identified as 61′.

When the selection shaft 15 is operating, the print shaft 16 is prevented from operation and vice versa. To this end, an interlock bar 66 is provided, as shown in FIGURE 8 between the spring clutch elements 48 and 54 for the selection shaft 15 and print shaft 16, respectively. The interlock bar 66 has depending ears 67 and 68 at opposite ends for pivotally mounting it for rocking movement. Interlock bar 66 is positioned between the laterally projecting ends 61 and 61' of the clutch springs 48 and 54 and engages the arms 59 or 59' with one or the other of the separate springs 48 and 54. When one of the arms 59 or 59' has released its spring, the other arm must engage the projecting end of its spring. Thus, the particular arm 59 or 59' when rocked by its solenoid 63 or 63' to clutch its selector shaft 15 or print shaft 16 to the motor 35 automatically prevents operation of the other shaft.

After one complete revolution of the selection shaft 15 or print shaft 16, the free end 61 or 61' of the springs 48 and 54 engages its clutch pawl 59 or 59' which has been moved back to its normal position by spring 62. When end 61 or 61' of the spring 48 or 54 is stopped the further rotation of the driving sleeve 47 or 52 tends to unwind its spring to insure release of the clutch sleeve. The spring 48 or 54 then prevents grabbing of the driven sleeve 47 or 52 and, if this were a steady set condition, the clutches would operate satisfactorily. However, the springs are apt to just barely release the clutch and product friction which loads the motor, heats up the clutches and shortens their lives. In order to eliminate these drawbacks, a shaft positioning cam 69 is provided on each shaft 15 and 16, as shown in FIGURE 9. Each shaft positioning cam 69 has a cam lobe 70 so positioned that at the instant the free end 61 or 61' of clutch spring 48 or 54 is stopped by the pawl 59 or 59', the positioning cam is located relative to a positioning arm 71 as illustrated in FIGURE 9. Positioning arm 71 is yieldingly pressed toward the cam 69 by a spring 72, and the combination of the inertia of the shaft 15 or 16 and tension of the spring 72 causes the arm 71 to turn the shaft slightly beyond the position where the clutch releases, as shown in dotted lines in FIGURE 9. This additional movement of the shaft 15 or 16 relative to its spring clutch element 48 or 54 further unwinds the spring sufficiently to eliminate any drag between the clutch parts.

While the spring element 48 and 54 of the clutches are shown exposed for clarity of disclosure, it will be understood that the springs are actually enclosed by sleeves which hold arm 59 or 59' in an operated position during a cycle to insure proper operation of the interlock. A properly functioning clutch never slips under load, but it is possible for the clutch to overrun and complete its single revolution in less than the prescribed time if the torque load should be reversed.

The clutch solenoids 63 and 63' supply the power to engage the clutches by withdrawing the pawls 59 and 59' from the ends 61 and 61' of clutch springs 48 and 54 to initiate either a select cycle or a print cycle. The solenoid 63 for operating the clutch spring 48 receives a momentary pulse from the data processing unit 6 as instructed by the teller from the keyboard 3. The solenoid 63' for operating the clutch for print shaft 16 receives its impulse from a circuit including a switch 73, see FIGURE 10, operated by a follower arm 74 actuated by a cam 75 on the selection shaft 15. Also, as shown in FIGURE 10, a cam 76 on print shaft 16 operates a follower arm 77 and switch 78 at the completion of a print cycle. Switch 78 sends an electric pulse from the printer to the data processing unit 6 which clears the unit for the next transaction.

Bail shaft 31 is rocked by the print shaft 16 after each printing operation and the bail shaft operates through mechanism, later to be described, for releasing the type bars for the next printing operation. To this end, the print shaft 16 mounts a cam 64 and the bail shaft 31 mounts a cam follower arm 65 having a follower roller engaging the cam, see FIGURES 6 and 26. Cam 64 has a lobe 79 so arranged as to oscillate the bail shaft 31 after a printing operation and just before the print shaft 16 completes a cycle of operation.

Type Bars and Selecting Mechanism

As stated above, the printer is provided with seven different groups of print bars 17 to 23 for printing, for example, the date, withdrawals, deposits, interest balance, particular teller number and account number. It will be understood, however, that a greater or lesser number of groups of type bars could be used, or greater or lesser number of bars could be used in each group depending upon the particular information to be printed in the particular perpetual inventory system with which the printer is used. The type bars 80 of the various groups and the operating mechanism for adjusting the bars is shown in detail in FIGURES 11 to 19 inclusive.

Figure 11:
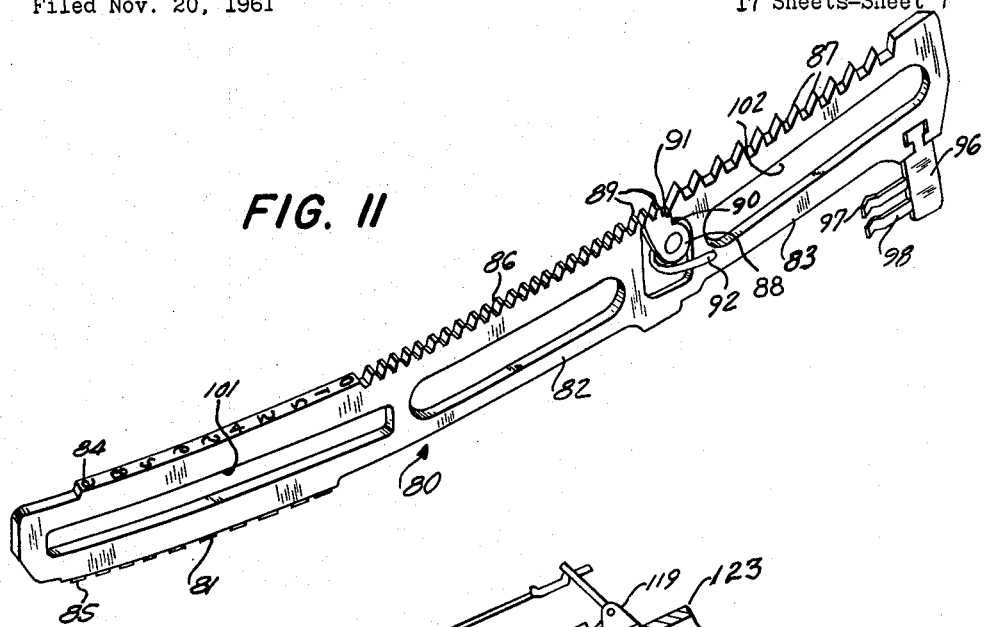
FIGURE 11 is a perspective view of one of the print bars.

The type bars 80 of all of the groups 18 to 23 are of identical construction and arranged in side by side relationship. As shown in FIGURE 11, each type bar 80 is of a thin, elongate form and having three separate sections 81, 82 and 83 in a one-piece structure. The front section 81 has corresponding type characters 84 and 85 projecting from the opposite top and bottom edges for printing on a bank book B$k$ at the bottom and on a record proof tape T$p$ at the top. The type bars 80 are of arcuate shape with the bottom edge convex so that the type characters 85 projecting from the convex side will print on a flat surface, such as a bank book B$k$. The type characters 84 projecting from the concave top edge of the bar 80 cooperate with a platen 27 of smaller radius to print on a record tape, as later explained more in detail. The top edge of the intermediate section 82 of the type bar has rack teeth 86 cut therein, and the top edge of the rearward section 83 has successive notches 87, there being one notch for each type character.

An opening is provided in the top edge of the bar between the intermediate and rearward sections 82 and 83. A dog is pivotally mounted on the bar and has a pair of rack teeth 89 at its upper edge which form a continuation of the rack teeth 86. Dog 88 has a shoulder 90 which engages a shoulder 91 on the bar when rocked clockwise to position the teeth 89 in alignment with rack teeth 86 at the upper edge of the bar. A spring 92 acts between the bar and dog 88 to rock the dog clockwise to engage its shoulder 90 with the shoulder 91 on the bar. However, the spring 92 yields to permit the dog to pivot counter-clockwise when a force is applied to the teeth 89 exceeding the tension of the spring 92.

Depending from the rearward end of the type bar 80 is a contact lug 96 having a pair of brushes 97 and 98 projecting forwardly therefrom. The contact lug 96 and brushes 97 and 98 are of less width than the width of the type bar 80, see FIGURE 17.

As shown in FIGURES 12 to 15, the type bars 80 are mounted on guide rods 99 and 100 extending transversely between the side plates 11 and 12 of the frame 10 and through slots 101 and 102 in the bars. Guide 99 is of rectangular form in cross section and extends through the slot 101 in the forward section 81 of the bar and guide 100 is of cylindrical form in cross section and extends through an arcuate slot 102 in the rearward section 83. Slots 101 and 102 also are of arcuate shape so as to mount the bars 80 for movement in an arcuate path. As shown in FIGURES 13 and 17, each bar when so mounted has its depending contact lug 96 projecting between spaced selector switch plates 103. Each switch plate 103 has spaced contacts 104 at opposite sides corresponding to the number of type faces 84 and 85 and a continuous contact 105 engaged by the brushes 97 and 98, respectively. Thus, one switch plate 103 provides contacts 104 and 105 at each side to serve two adjacent type bars 80 and, preferably, the contacts are printed on an insulating material. Each of the spaced contacts 104 on each switch plate 103 is connected to a separate terminal 106 which, in turn, is controlled from the data processing unit 6, see FIGURE 1, to supply current to one of the contacts which will selectively position its type bar 80 to print a particular character.

Figure 12:
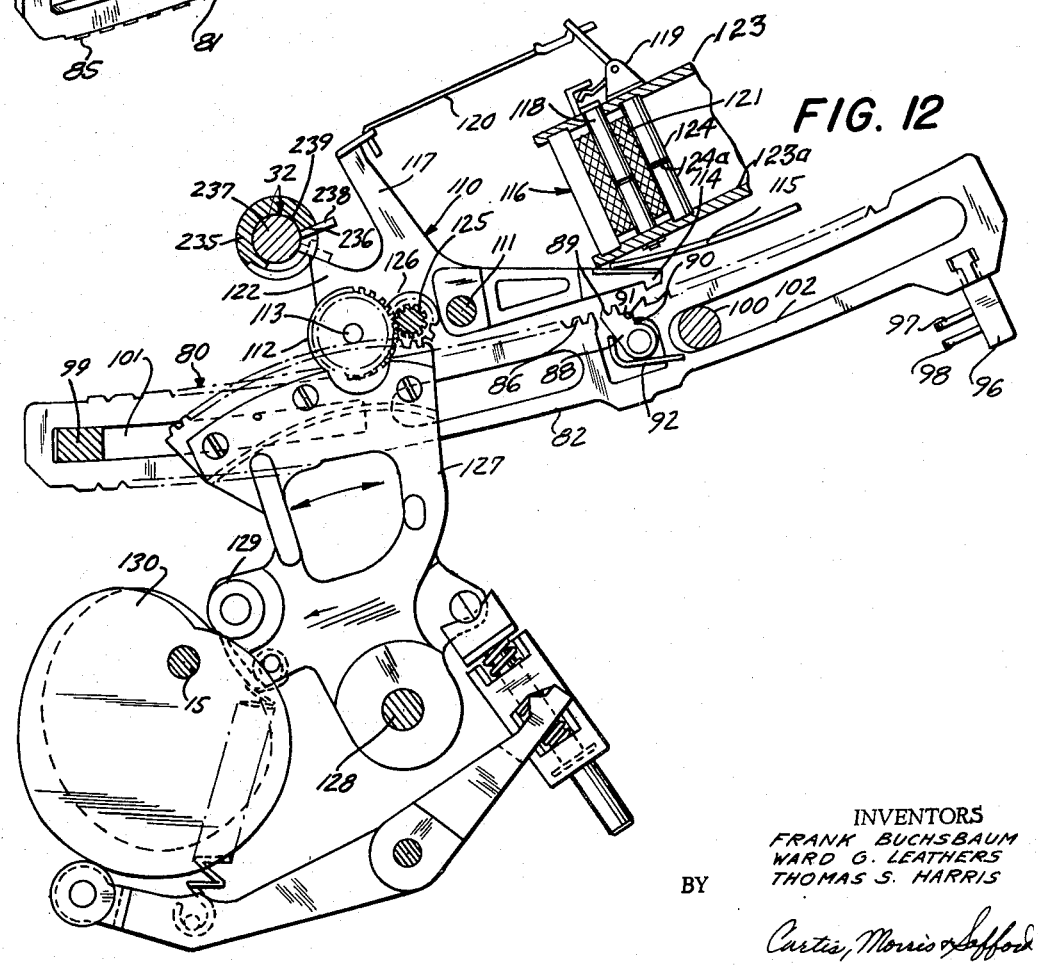
FIGURE 12 is a side elevational view of the operating means for adjusting the type bars to particular positions for a printing operation.

Each type bar 80 is moved to a particular selected position as controlled by the energized contacts 104 of the selective switch 103 through mechanism driven from selective shaft 15, see FIGURE 12. This mechanism comprises a bar positioning lever 110 for each type bar 80. The plurality of levers 110 are arranged in side by side relation on a transverse shaft 111 to overlie the top edge of the respective type bar 80. Each bar positioning lever 110 projects forwardly from shaft 111 and mounts a spur gear 112 on a stud shaft 113 for meshing engagement with the rack teeth 86 on the intermediate section 82 of the type bar. The lever 110 also projects rearwardly from the shaft 111 and has a detent 114 at its end for engagement with a detent notch 87 in the top edge of the rearward section 83 of the type bar. Thus, when the bar positioning lever 110 for a particular type bar 80 is rocked counterclockwise to the position illustrated in FIGURE 12, the gear 112 meshes with the rack teeth 86 and disengages the detent 114 from the detent notches 87 to adapt the gear to slide the type bar longitudinally to an adjusted position. On the other hand, when the lever 110 is rocked clockwise to the position illustrated in FIGURE 15, the gear 112 is disengaged from the rack teeth 86 and the detent 114 is engaged with a detent notch 87 to lock the type bar 80 in a printing position.

As shown in FIGURES 12 to 14, a leaf spring 115 acts on the right hand end of lever 110 tending to rock the lever clockwise to engage its detent 114 with a detent notch 87. Lever 110 is rocked counterclockwise against the action of spring 115 by bail 32 to engage gear 112 with the rack teeth 86 and the lever is held in this position by a permanent magnet 116 connected through linkage to upstanding arm 117 on the lever. Magnet 116 has a movable armature 118 magnetically held in the lower position illustrated in FIGURE 12 by engagement with a stop in a magnetic flux path. The armature 118 when moved to this lower position rocks a bell crank 119 and push rod 120 to rock the positioning lever 110 counterclockwise and engage the spur gear 112 with the rack teeth 86. Permanent magnet 116 produces a greater force on the positioning lever 110 than does the spring 115 so as to normally engage the gear 112 with the rack teeth 86. An electromagnetic winding 121 also is provided which reverses the force produced by the permanent magnet 116 so that the spring 115 will rock the lever 110 clockwise to engage the detent 114 with a notch 87 in the type bar when the winding is energized. When actuated by the spring 115, lever 110 will remain in locked position until it is mechanically rocked by bail 32 to the first position illustrated in FIGURE 12. Each bar positioning lever 110 is provided with a bailing nose 122 at the left hand side of the shaft 111 as viewed in FIGURE 12 for engagement by a reset bail 32, as later described in detail. A permanent magnet 116 and electromagnetic winding 121 is provided for each bar and the magnets are arranged in a bank between magnetic plates 123 and 123a and several tiers deep (not shown). A magnetic shunt bar 124 is provided in parallel with each magnet bar 116 and armature 118 and the shunt bar has a non-magnetic gap 124a, see FIGURES 14 and 15. This arrangement of shunt bars 124 maintains the flux density more uniform and reduces the loading required for any particular magnetic winding 121, due to the opening of a number of magnetic paths through armatures. Brushes 97 and 98 on the contact lug 96 of each type bar 80 are connected to the electromagnetic winding 121 for its particular positioning lever 110 so that when the brush 98 engages a hot contact 104 of the selective switch plate 103 as controlled by the data processing unit 6, an electric circuit is completed through the magnetic winding and the lever 110 rocked to a latching position.

The plurality of type bars 80 are all adjusted simultaneously by a splined drive shaft 125 which extends between the spaced side plates 11 and 12 of the frame 10 and mesh with the gears 112 on all of the positioning levers 110. The relationship of shaft 111 on which the positioning levers 110 are pivotally mounted with respect to the axis of spline shaft 125 maintains the gears 112 in mesh with the spline shaft 125 during rocking movement of the positioning levers. A driven gear 126 is mounted on the end of the spline shaft 125, see FIGURE 12, which meshes with a segment gear 127. Segment gear 127 is mounted to oscillate on a stud shaft 128 projecting from the side plate 12 of the frame and has a follower roller 129 engaging a heart shaped cam 130 on the end of selection shaft 15. As shown in FIGURE 12, an auxiliary follower provides a floating spring support which reduces the stored energy in the follower springs to thereby prevent overrunning of the selector shaft clutch 15. During one complete revolution of the selection shaft 15 the segment gear 127 is moved first in one direction and then in the other. When segment gear 127 moves in said first direction, it drives gear 126 and spline shaft 125 which, in turn, drives gears 112 to move the individual type bars 80 to the left into engagement with a stop 131 at the position illustrated in FIGURE 13. When the type bars 80 engage stop 131, the teeth 89 of the pivoted dog 88 on the bar underlies the gear 112 and the dog merely pivots and clicks without transmitting any motion to the type bar. However, upon reverse motion of the segment gear 127 and gear 112, the shoulder 90 on the dog 88 engages the shoulder 91 on the bar 80 to move its type bar rearwardly from the stopped position illustrated in FIGURE 13 to an adjusted position illustrated in FIGURE 14. When the brush engages a hot contact 104 on the selective switch plate 103 during such forward movement of the type bar, the electromagnetic winding 121 is energized which neutralizes the permanent magnet 116. Leaf spring 115 then rocks the positioning lever 110 clockwise to disengage the gear 112 from the rack teeth 86 and engage the detent 114 with a notch 87. As illustrated in FIGURE 15, the different bars 80 may be moved to a particular adjusted position as instructed by the data processing unit 6 so that at the end of one complete oscillation of the segment gear 127, see FIGURE 12, the plurality of type bars 80 are all locked in a printing position and will remain in this position during a printing impression. After a printing impression has been made, the type bars 80 are released by the bail 32 which rocks the positioning levers 110 back to the initial position illustrated in FIGURE 12.

The desired groups of type bars 80 except the one for printing the date may be automatically adjusted to a printing position by the mechanism described. The particular teller's number is set in section 8 of keyboard 3, see FIGURE 1, by a supervisor who then closes the section by a plate (not shown) and locks the plate to the keyboard. The date section 17 of bars 80 are manually set for each new month and day by hand wheels 133 and 134 having concentric shafts with the separate gears 135 meshing with the rack teeth 86 on the bars 80.

*Carriage*

The carriage 25 illustrated generally in FIGURE 1 for supporting a bank book in position for printing is shown in detail in FIGURES 20 to 25.

Carriage 25 comprises a marginal frame having side 138 and 139 to underlie the sides of an opened bank book Bk and ends 140 and 141 for underlying the ends of the bank book, see FIGURE 21. A flange 142 overlies the end 141 to provide a clip for holding the leaves of the book in flat position and a narrow clip 143 is adapted to overlie the leaves of the open book adjacent the opposite end 140. Thus, the useable lined portions of the bank book Bk are exposed to permit a platen to move through the open center of the marginal frame and press the book against the type characters 85 on the lower edges of the plurality of type bars 80.

Carriage 25 is mounted on the frame 10 of the machine for sliding movement relative to the printing position. To this end, the sides 138 and 139 have depending rails 144 and 145 adapted to slide in grooves 146 and 147 in the frame. As shown in FIGURES 23 and 24, a rack 148 is provided on the inside edge of rail 145 and meshes with gear teeth 149 on the periphery of a drum 150. Although not shown, the drum 150 is mounted to rotate on the machine frame 10 and has a spring acting between it and the frame tending to rotate it counterclockwise as viewed in FIGURE 20 to move the carriage 25 forwardly in the printer 4. The rail 145 also is provided with ratchet teeth 151 at its lower edge which are engaged by pawls 152 and 153 to hold the carriage in any adjusted position.

Pawls 152 and 153 are normally spring pressed to engage the ratchet teeth 151, but are manually actuated to a releasing position by a control lever 156 pivotally mounted on the rearward end 140 of the carriage. As shown in FIGURES 20 and 21, the lever is positioned in a hand grip 157 transversely of the carriage and pivotally mounted intermediate its ends on a pivot pin 158. A hairpin spring 159 acts between the hand grip 157 and control lever 156 to rock the latter on the pivot 158 to the position illustrated in FIGURES 20 and 21. The outer end of lever 156 is pivotally connected to a shackle 160 which, in turn, is connected to a pawl release bar 161 mounted on the side rail 145. Release bar 161 is mounted on spaced pins 162, see FIGURE 21, projecting laterally from the side of the rail 145 through inclined slots 163 in the bar. A spring 164 is connected between the end of the release bar 161 and the carriage 25 tending to move the release bar forwardly and the inclined edges of the slots moving along the pins 162 raise the bar to the position illustrated in FIGURE 22.

However, when the control lever 156 is manually rocked on its pivot 158, the opposite end of the lever pulls the release bar 161 rearwardly against the action of the spring 164 and the pins 162 acting in the inclined slots 163 cam the bar downwardly to engage a pin 173 projecting laterally from pawl 153 to disengage pawls 152 or 153 from the ratchet teeth 151. When the pawls 152 and 153 are disengaged, the spring actuated drum 150 acting on the rack 148 tends to move the carriage 25 forwardly as controlled by the teller who positioned the bank book Bk so that the next available line is positioned at the printing station, as indicated by the indicator 26 at the end of the manual grip 157. Thus, the teller can move the book to any desired position and release the control lever 156 which will automatically lock the carriage in adjusted position.

The carriage 25 is indexed forwardly a distance corresponding to one line in the bank book after each printing operation. For this purpose, the pawls 152 and 153 act alternately in succession to engage a successive ratchet tooth 151. As shown in FIGURE 25, both pawls 152 and 153 are yieldingly urged to latching position by springs 165 and 166. The pawls 152 and 153 are in the form of bell cranks pivotally mounted on a shaft 167 and having teeth at the end of one arm and laterally projecting follower pins 168 and 169 on the opposite arms positioned at opposite sides of the bail shaft 31. The follower pins 168 and 169 project into engagement with shoulders 170 and 171 of a cam 172 fast on the bail shaft 31. Thus, when the bail shaft 31 oscillates, first clockwise and then counterclockwise, adjacent the end of a printing operation, the major pawl 152 is rocked counterclockwise to disengage a ratchet tooth 151, and the minor pawl is released for actuation by the spring 166 to engage the next adjacent tooth. The pawls 152 and 153 are spaced apart a distance less than the spacing of one ratchet tooth 161 so that the major pawl 152 is released to engage the next adjacent tooth during the reverse movement of the bail shaft 31 which, in turn, withdraws the minor pawl 153. Thus, the carriage 25 is advanced through a distance of one ratchet tooth 151 after each printing operation which corresponds with the spacing of the lines in the bank book to be printed. After the completion of a particular banking transaction, the entire carriage 25 is withdrawn manually to its rearmost position and the bank book removed and returned to the customer.

*Printing Mechanism*

The printing mechanism referred to above, generally, is shown in detail in FIGURES 26 and 27. The printing mechanism, in fact, comprises two separate mechanisms driven from the printing shaft 16 for printing an impression on the bank book Bk and record tape Tp. Bank book Bk is printed from the type characters 85 on the underside of the type bars 80 and record tape Tp is printed from the type characters 84 on the upper edges of the type bars.

The mechanism for printing an impression on the bank book Bk is shown in FIGURE 26 as comprising an anvil 175 mounted on one end of an arm 176 pivotally mounted at its other end on a stationary part 177 of the frame. A spring 178 acting between the stationary frame part 177 and arm 176 moves the latter against a stop 179 to position the anvil below the bank book Bk. The lower side of the outer free end of the arm 176 mounting the anvil 175 is recessed at 180 and rests on the end of a pivoted actuating arm 181. The opposite end of the arm 181 is pivotally connected to one arm of a bell crank 182 mounted to rock freely on the bail shaft 31. The inner end of the actuating arm 181 mounts a follower roller 183 which, in turn, bears on a cam 184 on the print shaft 16. A spring 185 acts between the bell crank 182 and actuating arm 181 to hold the follower roller 183 in engagement with the cam 184. When the print shaft 16 is rotated clockwise from the position shown in FIGURE 26, the lobe 186 of the cam 184 raises the actuating arm 181 which, in turn raises the free end of the arm 176 to cause the anvil 175 to engage the underside of the bank book Bk and press it against the type characters 85 on the print bars 80 to make an impression on the book. After the impression has been made, the follower roller 183 rides downwardly from lobe 186 of the cam and returns the anvil 185 to the initial position illustrated in FIGURE 26 which completes a printing cycle on the book.

It will be noted in FIGURE 26 that the lobe 186 of the cam 184 on the print shaft 16 leads the lobe 79 on the cam 64 for rocking the bail shaft 31 so that the printing operation is completed before the bail shaft is actuated. A spring 187 acts between the bell crank 182 and a portion 188 of the machine frame for yieldingly urging the follower arm 181 into a printing position between the cam and platen.

There are times when it is necessary to print on the record tape Tp without printing on the bank book Bk. For example, when a teller requests the balance in a particular account, the balance is printed on the tape Tp before the book is even placed on the carriage. To accomplish this result, the carriage 25 has a depending lug 192 and an extended end 193 of an arm of the bell crank 182 mounting the actuating arm 181 extends up into the path of the depending lug. Thus, when the carriage 25 is moved rearwardly to an extreme position, the lug 192 engages the projecting end 193 of the bell crank 182 and rocks it against the action of the spring 187 to withdraw the actuating arm 181 from its position between the cam 184 and print arm 176. With the follower arm 181 withdrawn, the print shaft 16 may rotate without actuating the anvil 175. However, as soon as the carriage 25 is moved to a position where the bank book Bk overlies the anvil 175, lug 192 releases the bell crank 182 and the spring 187 moves the bell crank 182 and actuating arm 181 into an operative printing position.

The upper cylindrical platen 27 is moved downwardly against the type characters 84 at the upper edges of the type bars 80 to print an impression on the tape T*p*. To this end, the platen 27 has reduced ends 194 rotatably mounted in one end of arms 195 of a cradle pivotally mounted on a shaft 196 for rocking movement toward and away from the print bars. A spring 197 acts between the frame and the cradle having arms 195 to raise the platen 194. The upward movement of the platen 194 is limited by links 198 connected between each end of the platen 27 and eccentric driving pins 199 at the ends of the print shaft 16. Thus, when the print shaft 16 is rotated, eccentric pins 199 acting through the links 198 depress the platen 27 toward the type bars 80 to press the tape T*p* against the type bars. The eccentrics 199 are angularly arranged with respect to the lobe 186 of the cam 184 so that the tape T*p* and bank book B*k* are printed successively during one revolution of the print shaft 16.

Figure 4:
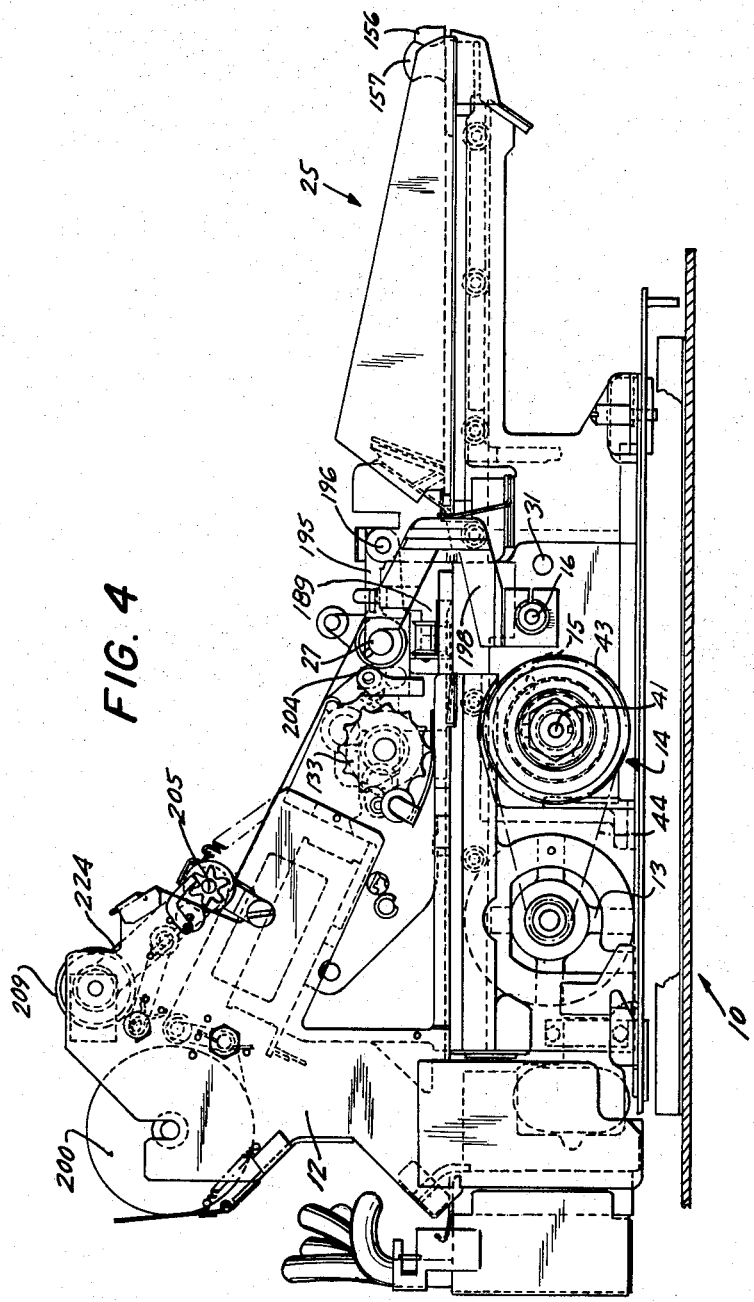
FIGURE 4 is a side elevational view of the opposite side of the printer.

In addition to printing the record sheet B*k* and tape T*p*, the printer is adapted to print a tab card, such as a check, which may be inserted through slot 189 formed in links 198, as shown in FIGURE 4.

Tape Feed Mechanism

As stated above, the tape T*p* to be printed is located on the underside of the platen 27 so that the printed indicia may not be observed by the teller. A tape feeding mechanism is illustrated in detail in FIGURES 28 and 29 for the purpose of moving the tape T*p* to an observation station S1 after each printing operation. As shown, the tape is first driven rearwardly to position the line to be printed at a printing station S2 before a printing operation, and then is driven forwardly from the printing station S2 to the observation station S1 to expose the indicia last printed after each printing operation has been completed. In order to maintain the tape T*p* taut at all times, separate driving means are provided for driving the tape in opposite directions.

The tape T*p* to be printed is withdrawn from a reel 200 and extends over spaced pulleys 201 and 202 mounted on a pivoted arm 203 for automatically taking up any slack in the tape. The tape then extends into the bight between the back-up roll 204 and the platen 27 constituting one driving means for driving the tape downwardly into a printing position and then upwardly into the bight between the driving and driven rolls 205 and 206 of a second driving mechanism for driving the tape to an observation position. Tape T*p* extends from the second driving means over a pulley 207 on a take-up arm 208 to a wind-up reel 209. Platen 27, see FIGURE 29, has a spur gear 210 at one end and adjacent the spur gear is a ratchet 211 having teeth 212. A driving arm 215 overlies the spur gear 210 and has rack teeth 216 engaging the teeth on the gear to rotate platen 27 in opposite directions as the arm is reciprocated. In addition, the arm 215 has pawl 217 adjacent the rear of the rack teeth 216 which engages the teeth 212 of the ratchet 211 to drive the platen 27 clockwise and raise the rack teeth 216 from engagement with the spur gear 210.

A second driving arm 218 is provided for driving the drive roll 205 of the second driving mechanism and has rack teeth 219 for engaging the underside of a spur gear 220 on the drive roll. The outer end of the arm 218 is supported by a roller 221 to maintain the rack teeth 219 in engagement with the underside of gear 220 to rotate in the opposite direction from platen 27. The take-up reel 209 is driven from the drive roll 205 to continuously wind up the tape T*p*. To this end, a pulley 222 is provided at one end of the driving roll 205 through a one way clutch and connected to a pulley 223 on the reel 209 by a belt 224.

The arms 215 and 218 are reciprocated by a common operating means to rotate the platen 27 and drive roll 205 of the separate tape driving means simultaneously. The common operating means is a lever 225 pivoted at 226 and the ends of the arms 215 and 218 are pivotally connected to the lever. Thus, when the lever 225 is rocked clockwise, as viewed in FIGURE 28, the rack teeth 216 and 219 on the arms 215 and 218 rotate the platen 27 clockwise and the drive roll 205 counterclockwise. During such movement of lever 225, drive roll 205 drives the tape T*p* from a printing station S2 to an observation station S1. Rocking movement of the lever 225 counterclockwise causes platen 27 to drive the tape T*p* from the observation station S1 to the printing station S2.

The arrangement of the rack teeth 216 and pawl 217 on the arm 215, illustrated most clearly in FIGURE 29, operates as a gainer mechanism for advancing the tape T*p* a distance equal to one line of spacing after each printing operation. In other words, the rack 219 on arm 218 positively drives the tape through a distance corresponding to the distance between the stations S2 and S1 plus one line space. During such movement of the tape T*p*, the pawl 217 on arm 215 engages ratchet teeth 212 and disengages the rack teeth 216 from the gear 210. Upon rocking movement of the lever 225 counterclockwise, the arm 215 and rack teeth 216 thereon move relative to the teeth of the gear 210 until the pawl 217 slips off the tooth 212 of the ratchet 211. This relative movement of the arm 215 and platen 27 before the rack teeth 216 engage gear 210 corresponds to one print line on the tape. The rack 216 then engages the gear 210 and drives the platen 27 counterclockwise and the tape thereon, but through a distance less than the distance which the tape was advanced by the driving roller 205. Thus, after each printing operation the newly printed indicia is moved to the station S1 where it may be observed by the teller.

Lever 225 is yieldingly rocked clockwise by a spring pressed rod 227 and in a counterclockwise direction against the action of the spring pressed rod 227 by a cam 228 on the selection shaft 15. To this end, the lever 225 has a cam follower 229 engaging the cam. As will be observed by reference to FIGURE 28, the cam 228 rocks the lever 225 counterclockwise during rotation of the selection shaft 15 to move the tape T*p* from the observation station S1 to the printing station S2. When once moved to the position shown in FIGURE 28, the lever 225 is latched in printing position by a latch member 230 engaging a stop shoulder 231 on the lever and remains in printing position until the latch is released by operation of the bail shaft 31, as later explained more in detail.

From the foregoing description it will be apparent that when a transaction is initiated, the initial rotation of the selection shaft 15 and cam 228 thereon rocks the lever 225 counterclockwise and acting through the arm 218 drives the tape T*p* from the observation station S1 to the printing station S2. The lever 225 and platen 27 are then latched in printing position by the engagement of the latch 230 with the shoulder 231 on the lever. The platen 27 remains in printing position until the printing shaft 16 has been operated to print on the tape after which the bail shaft 31 is actuated to bodily move the latch 230 from engagement with the shoulder 231. Spring pressed rod 227 then rocks lever 225 clockwise and, acting through the arm 218 and rack teeth 219, rotates the drive roll 205 and tape T*p* from the printing station S2 to the station S1 where the printed indicia may be observed by the teller. Rotation of the drive roll 205 and pulley 222 operates through the belt 224 to rotate the take-up reel 209. A one-way clutch (not shown) is provided between the pulley 222 and drive roll 205 to drive the reel 209 in one direction only. The spring pressed take-up arms 203 and 208 take-up any slack in the tape between the platen 27 and reels 200 and 209 during the movement from stations S1 to S2 and reduce high acceleration of spools 200 and 209.

Bailing Mechanism

As previously explained, the type bars 80 of the various groups 18 to 23 are individually moved to a printing position in accordance with instructions from the data processing unit 6 and locked in printing position by the individual bar positioning levers 110. After each printing operation the bar positioning levers 110 are rocked from a locking position to a driving position by a bailing mechanism as next explained.

The bail 32 is shown in FIGURES 12 to 14 as comprising the general bail 235 for releasing the bar positioning levers 110 for all of the type bars 80 except those in groups 17 and 21 for printing the date and balance, and a balance bail 237 for releasing the bar positioning levers 110 for type bars of the group 21 for printing a balance. The general bail 235 is shown as comprising a tube extending between the side plates 11 and 12 of the frame 10 and slotted to provide a shoulder 236 which engages the nose 122 of the bar positioning levers 110. The balance bail 237 is in the form of a shaft mounted to rock in the general bail tube 235 and has a radial plate 238 for resetting the bar positioning levers 110 for the type bars 80 of group 21 for printing a balance. To this end, the portion of the general bail 235 overlying the balance bail type bars 80, see FIGURE 32, is recessed at 239 to permit movement of the balance bail plate 238 relative to the tube.

Figure 30:
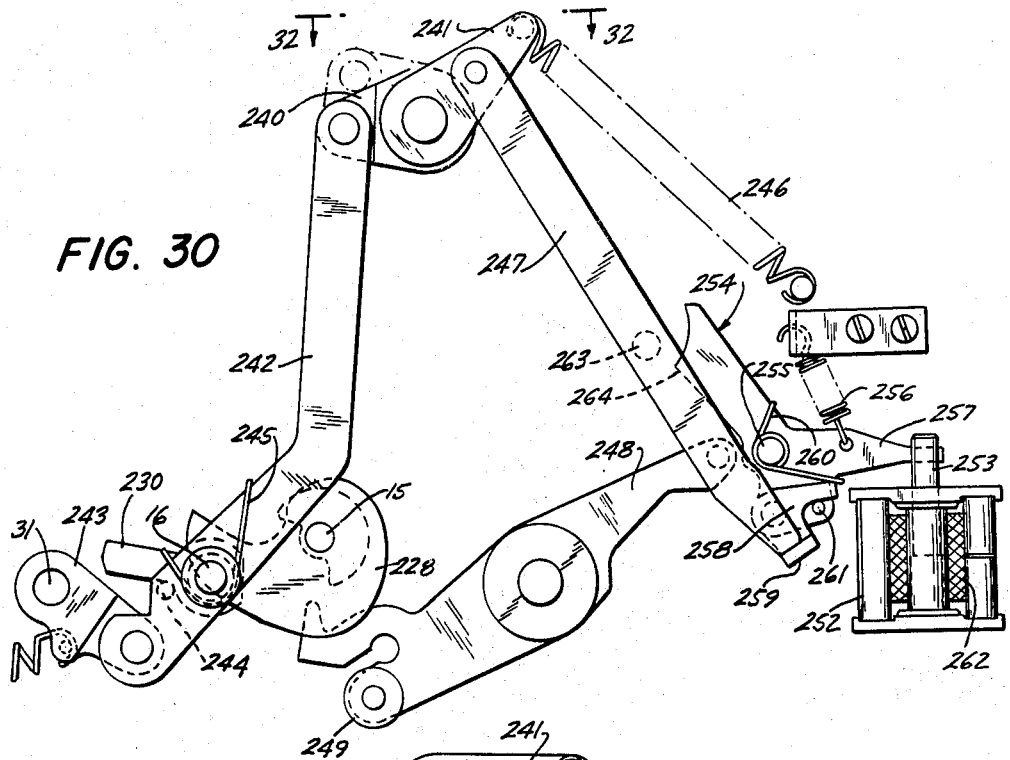
FIGURE 30 is a side elevational view of the bail operating mechanisms.
Figure 32:
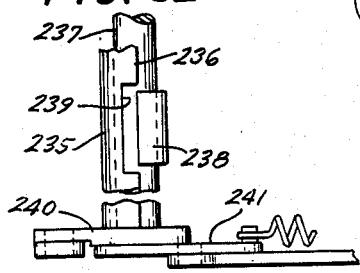
FIGURE 32 is a plan view showing the construction of the combined general and balance bails.
Figure 31:
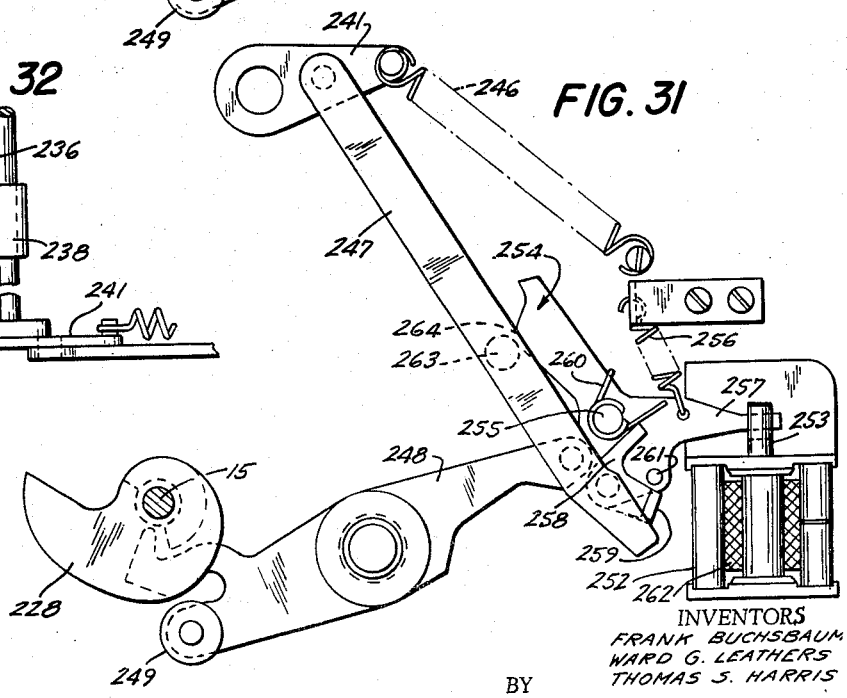
FIGURE 31 is a view similar to FIGURE 30 showing the relationship of the parts when the balance bail has been operated.

The operating mechanisms for the general bail tube 235 and balance bail shaft 237 are shown in detail in FIGURES 30 to 32. Tube 235 and shaft 237 extend beyond the side plate 12 of the frame 10 and have separate radially extending crank arms 240 and 241, see FIGURES 30 and 32. Thus, when tube 235 is rocked clockwise, as viewed in FIGURE 12, its shoulder 236 will engage the nose 122 of each bar positioning lever 110, except those in group 21 for printing the balance, and rock them from the position illustrated in FIGURE 15 back to the position illustrated in FIGURE 12 to reset the printer for the next operation. The balance bail 237 when operated by instructions from the data processing unit 6, resets the bar positioning levers 110 for type bars 80 of the balance group 21.

As shown in FIGURE 30, a link 242 has one end connected to the crank arm 240 of the general bail tube 235. The lower end of the link 242 is connected to a crank arm 243 projecting from the bail shaft 31. At the completion of a printing operation the cam 64 on the print shaft 16, see FIGURE 26, operates the follower arm 65 projecting from the bail shaft 31 and oscillates the bail shaft against the action of springs 250, see FIGURES 6 and 28. The oscillation of bail shaft 31 is transmitted through the crank arm 243 and link 242 to oscillate the general bail 235. As bail 235 oscillates clockwise as viewed in FIGURE 12, the shoulder 236 engages the nose 122 of the plurality of bar positioning levers 110 and rocks them from the locking position illustrated in FIGURE 15 to the driving position illustrated in FIGURE 12.

It will be noted that the latch 230 for latching the tape feed lever 225 is mounted on the link 242. The latch 230 is pivotally mounted on the link 242 adjacent its lower pivoted end and is held against a stop 244 by a spring 245. Spring 245 yields to permit latch 230 to rock relative to stop pin 244 so that shoulder 231 on lever 225, see FIGURE 28, may slip by the latch 230 when the tape feed lever 225 is rocked counterclockwise and then spring back to latching position. Alternately, when the link 242 is lifted by the crank arm 243 on the bail shaft 31, it bodily moves the latch 230 out of engagement with the shoulder 231 on the tape feed lever 225 to release the latter.

The balance bail 237 operates upon the transmission of a low power electric signal from the data processing unit 6 and is driven by a spring 245 instead of being positively operated by the driving mechanism 14. In the arrangement disclosed, a balance bail link 247 has one end connected to crank arm 241 to retract the balance bail 237 and load the bailing spring 246, and is connected adjacent its opposite end to one end of a lifting lever 248 having a follower 249 operated by the cam 228 for the tape feed. The link 247 also is part of a latching system which together with a magnet 252 controls the operation of the balance bail 237, see FIGURES 30 and 31, when the magnet releases its plunger 253 upon instructions from the keyboard 3 and data processing unit 6. An interlock is provided between the balance bail 237 and selection shaft 15 and is illustrated in FIGURE 31 as a cam on the shaft cooperating with a projection on lever 248.

The latching mechanism comprises a bell crank release lever 254 which is mounted to rotate on pivot pin 255. A spring 256 is connected to one arm 257 of lever 254 which tends to rock it counterclockwise as viewed in FIGURE 30. The arm 257 also is connected to armature 253 of magnet 252 which opposes spring 256. Also mounted on the bell crank release lever 254 is a bell crank 258 having a laterally projecting shoulder 259 adapted to underlie the end of link 247 to hold it in a cocked position. A spring 260 acts between lever 254 and bell crank 258 to yieldingly hold it against a stop 261 in the latching position illustrated in FIGURE 30. When magnet 252 is de-energized by supplying electric current to winding 262, spring 256 rocks release lever 254 and acting through stop pin 261 rocks bell crank 258 thereby pulling the latching shoulder 259 from under the bail link 247. Link 247 then moves down under the action of the spring 246 from the position illustrated in FIGURE 30 to that illustrated in FIGURE 31. This rocks the balance bail shaft 237 and radial plate 238 clockwise from the position illustrated in full lines to that illustrated by dotted lines in FIGURE 12 and bails the positioning levers 110 for the type bars 80 in group 21 in the same manner as the other levers were bailed by the bail tube 125.

One difference, however, is that the pressure on the positioning levers 110 is maintained until the selection shaft 15 has started to move. As the selection shaft 15 starts to rotate, cam 228 acts through follower 249 on lever 248 to lift the link 247 and reset the bail shaft 237 to its inoperative position. During the initial downward movement of a link 247 to operate bail 237 a pin 263 on the link, see FIGURE 31, engages a cam face 264 on releasing lever 254 to rotate it clockwise so as to carry its magnet plunger 253 downwardly into magnetic locking position at the bottom of its stroke. During the upward movement of link 247 the latching bell crank 258 is rocked clockwise by spring 260 to engage its shoulder 259 under the end of link 247 as it is raised to latch it in its initial releasing position shown in FIGURE 30. The type bars 80 of the different groups 18 to 23 are thus reset for another selection and printing cycle.

Type Ribbon and Operating Mechanism

The type characters 84 and 85 at the top and bottom edges of the type bars 80 produce an impression on the bank book B*k* and record proof tape T*p* by means of an inked ribbon 33. The inked ribbon 33 and its operating mechanism are shown in detail in FIGURES 33 to 35.

Figure 33:
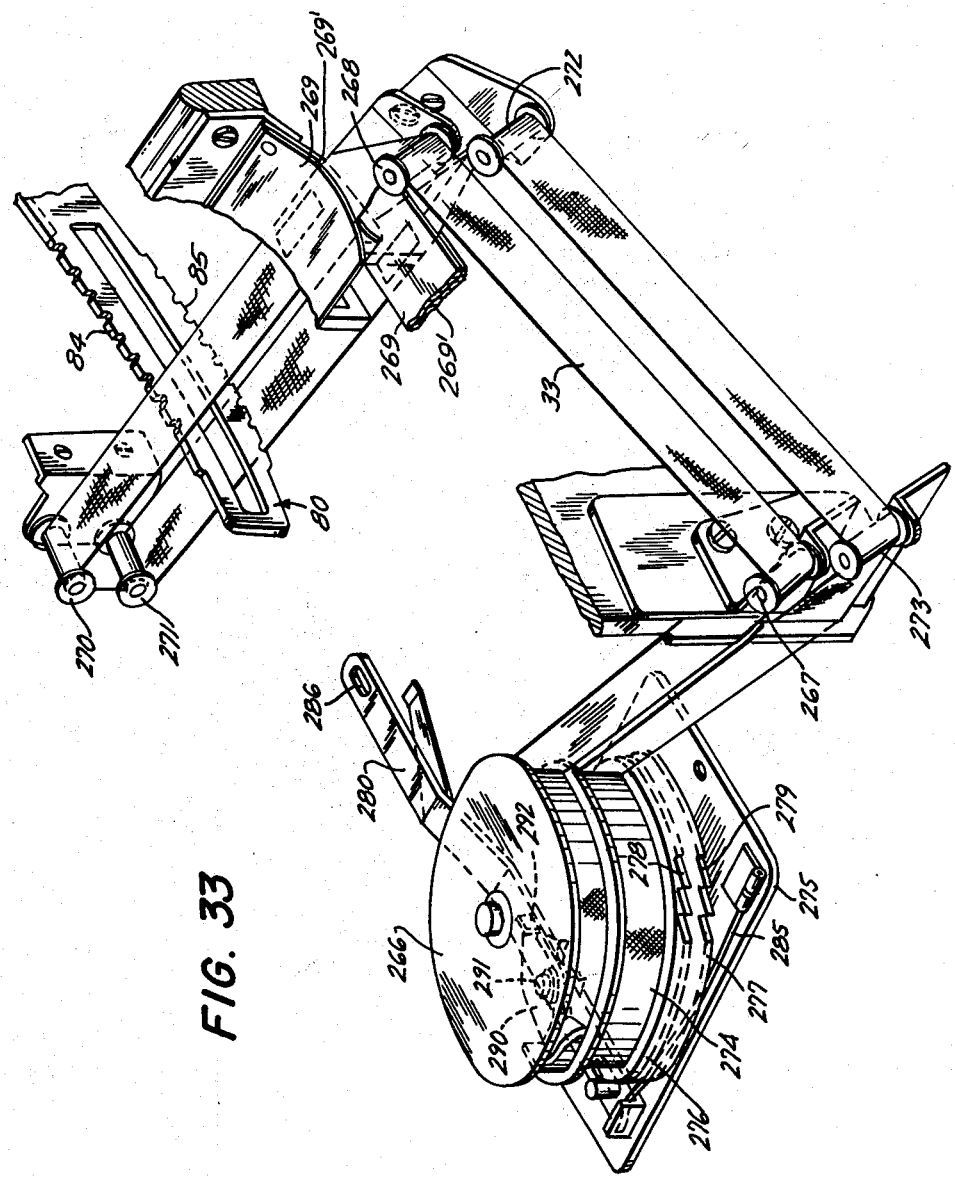
FIGURE 33 is a perspective view showing the manner of mounting a single printing ribbon for printing both the bank book and proof tape.

As shown in FIGURE 33, the ribbon 33 extends in vertical arrangement from a top reel 266 over guides 267 and 268 and then between horizontal plates 269 which turn it from a vertical to a horizontal arrangement. The ribbon 33 then passes horizontally over the top of the type bars 80 at the printing station. Ribbon 33 is reversed by guides 270 and 271 to pass under the type bars in horizontal arrangement at the printing station and then through another pair of horizontal plates 269. Guides 272 and 273 again turn the ribbon from a horizontal to a vertical arrangement for delivery to a lower reel 274.

The reels 266 and 274 are positioned one over the other on a base plate 275 and mounted for rotation on separate hubs having radial plates 276 and 277, respectively, the lower reel 274 being connected to plate 276 and upper reel 266 being connected to the plate 277. The peripheral edges of the plates 276 and 277 have ratchet teeth 278 and 279, and the reels 274 and 266 connected thereto are driven in the same direction by an arm 280 mounted to slide on the base 275.

Figure 34:
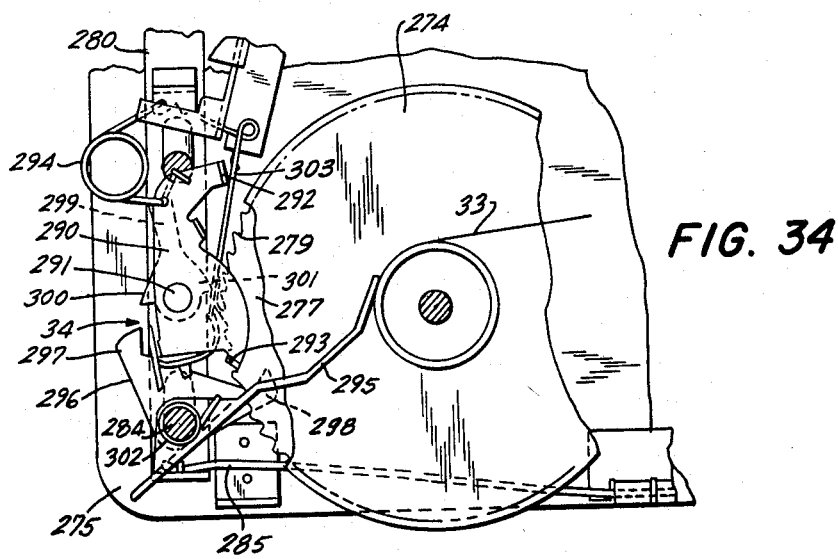
FIGURE 34 is a plan view of the lower ribbon reel and ratchet drive therefor.
Figure 35:
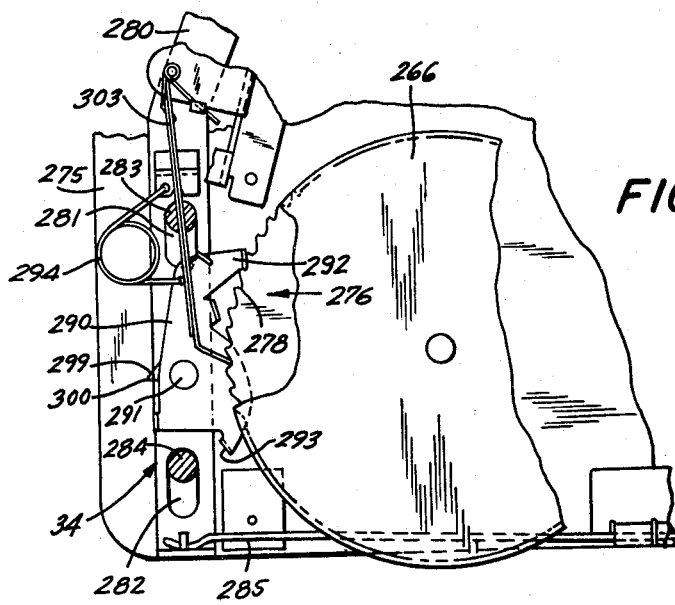
FIGURE 35 is a plan view of the upper ribbon reel and drive therefor.

As shown in FIGURE 35, the arm 280 has spaced slots 281 and 282 through which pins 283 and 284 project upwardly from the base 275. A spring 285 acts between base 275 and one end of the slide bar 280 to move it to the position illustrated in FIGURE 35 and the opposite end of the bar has a slot 286 therein engaged by a lug projecting from the bail shaft 31, see FIGURES 3 and 6, for moving the bar to the position illustrated in FIGURE 34. As shown most clearly in FIGURES 34 and 35, a two position pawl 290 is mounted to rock on a pin 291 on the slide bar 280 and is located between disks 276 and 277. Pawl 290 has an upwardly projecting lug 292 for engagement with the ratchet teeth 278 on the disk 276 mounting a reel 274 and a downwardly projecting lug 293 for engaging the ratchet teeth 279 on the disk 277 mounting the upper reel 266. An over center toggle spring 294 yieldingly holds pawl 290 in one or the other of its two positions to engage either the lug 292 or 293 with its respective disk 276 and 277 to drive the corresponding reel 274 or 266 in the same direction upon sliding movement of the bar 280. Thus, when the bar 280 is reciprocated by the bail shaft 31 and spring 285 after each printing operation, the pawl 290 on the bar will drive one or the other of the reels 266 and 274 to move the ribbon through a small increment.

A reversing mechanism is provided for rocking the pawl 290 from one to the other of its two positions illustrated in FIGURES 34 and 35 to drive one or the other of the reels 266 and 274. As shown most clearly in FIGURE 34, the reversing mechanism comprises a feeler arm 295 pivotally mounted on the fixed pin 284 and has a bifurcated member 296 with opposite shoulders 297 and 298. A cooperating detent member 299 is mounted on the pawl 290 and has shoulders 300 and 301 at its opposite sides. Detent member 299 is connected fast with the pawl 290 and the shoulders 300 and 301 so located as to engage the shoulders 297 or 298, respectively, of reversing member 296 during reciprocation of the sliding bar 280 after each printing operation.

As shown in FIGURE 34, the feeler arm 295 is yieldingly pressed inwardly by a spring 302 to feel the ribbon 33 as it is withdrawn from the lower reel 274. Thus, the lower plate 277 and upper reel 266 are being driven by the engagement of lug 293 on pawl 290 with the ratchet teeth 279 of the lower plate. During each rearward stroke of the bar 280 the driving mechanism advances the upper reel 276 a distance corresponding to one tooth on the ratchet 279. A stationary back pawl 303 is provided for holding the plate 277 during the forward stroke of the pawl 290.

This operation to feed ribbon 33 continues until feeler arm 295 has rocked the shoulder 297 of the bifurcated member 296 into position for engagement by the shoulder 300 of the detent member 299. When the shoulder 300 of detent member 299 engages the shoulder 297 of the bifurcated shifting member 296 during reciprocation of the bar 280, the pawl 290 is rocked from the position illustrated in FIGURE 34 to that illustrated in FIGURE 35 and thereby shifts the drive from the upper to the lower reel. During such rocking movement, the end of the toggle spring 294 is moved through a center line between the pawl 290 and spring to yieldingly hold the pawl in the new driving position. Vice versa, when the feeler 295 is rocked counterclockwise from the position illustrated in FIGURE 34 by the winding of the ribbon thereon, it will shift the shoulder 298 of the bifurcated shifting member 296 into position to engage the shoulder 301 on the pivoted pawl 290. When required both reels 266 and 274 may be removed and a new ribbon substituted.

Summary of Operation

Assuming for the purpose of description that the entire system has been placed in an operative condition, that the motor 13 is operating and a source of current at a substantial voltage is connected to energize the selective switch contacts 104 in circuits with windings 121 of the magnets 116, see FIGURES 14 and 15, as controlled by signals from the data processing unit 6. Further, let it be assumed that a customer wishes to deposit a sum of money to his account and that the teller has already verified the amount shown in the account by the data processing unit 6 with the amount indicated in the customer's bank book.

To perform the transaction, the teller first opens the bank book B$k$, inserts it in the carriage 25, see FIGURE 1, and moves the carriage and opened bank book to the next line available for printing as shown by the indicator 26. The teller then punches the amount to be deposited on the keys A of the keyboard 3, see FIGURE 1, and presses the button C which requests the data processing unit 6 to add the amount to the particular customer's account and print the amount on the bank book B$k$ and record tape T$p$. After the amount deposited has been printed the data processing unit 6 transmits a signal through cable 7 instructing the printer 4 to print the new balance on the bank book B$k$. In performing a printing operation the signal produced by depressing button C initiates operation of the printer 4 and produces the sequence of operations in the particular timed relation indicated by the charts of FIGURES 36 and 37. Chart 36 shows the timed relation of the selection shaft 15 and various elements operated by the shaft; and the chart 37 shows the timed relation of the print shaft and elements operated thereby. In each of the charts 36 and 37 the ordinate indicates the various elements and the absicissa is divided into degrees corresponding to a complete revolution of the selection shaft.

Figure 36:
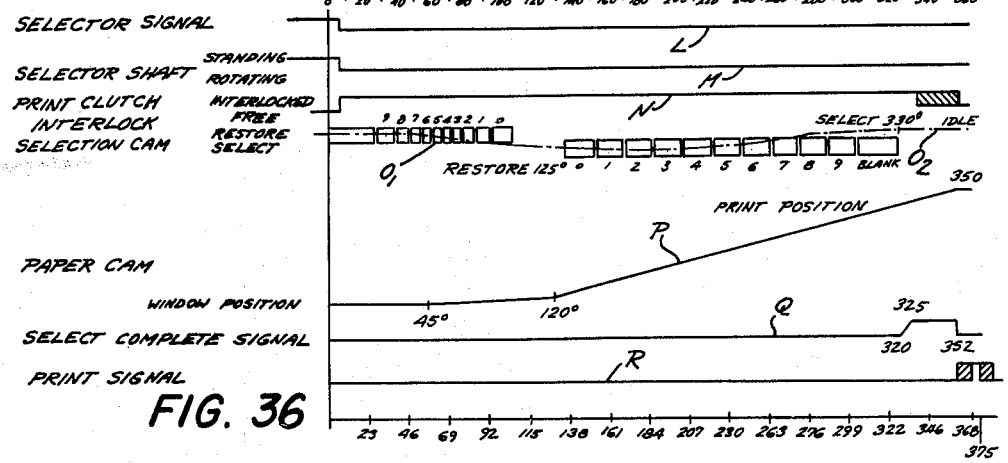
FIGURE 36 is a timing chart showing the time relation of the elements operated by the selection shaft.

When the signal is received by the printer 4 as indicated by graph L in FIGURE 36, the clutch actuating solenoid 63 for selection shaft clutch 42, see FIGURES 6 and 7, is immediately energized to actuate the pawl 59 and release the clutch spring 48 which then drives the selection shaft 15 from motor 13 at the beginning of a cycle as indicated by graph M. When the pawl 59 for clutch 42 is actuated, it concurrently actuates interlock bar 66, see FIGURE 8, to positively prevent operation of the print shaft 16 until one complete revolution of the selection shaft 15 has been completed.

Rotation of the selection shaft 15, see FIGURE 12, operates through the heart-shaped cam 130 and follower 129 to oscillate the segment gear 127 first clockwise and then counterclockwise. As the segment gear 127 rotates clockwise, it rotates gear 126 and spline shaft 125 on which it is mounted. Spline shaft 125, in turn, rotates the driving gears 112 on each of the bar positioning levers 110 which, in turn, mesh with the rack teeth 86 on the plurality of type bars 80 and moves them toward the left from the position illustrated in FIGURE 12 against a stop 131 illustrated in FIGURE 13. When each bar 80 engages stop 131, driving gear 112 overlies the dog 88 on its type bar which permits the gear to slip relative to the type bar. This initial movement of the type bars 80 continues until all of the bars engage the stop 131 and are at the same starting position. This initial movement of bars 80 to a starting position is indicated by the portion $O_1$ of graph O in FIGURE 36.

Upon movement of the segment gear 127 counterclockwise, see FIGURE 12, the gearing drives the type bars 80 in the opposite direction or toward the right to a particular selected position, as illustrated in FIGURES 14 and 15. This is controlled by the brushes 97 and 98 on each type bar 80 which connect a particular hot contact 104 of its selective switch 103 in circuit with the winding 121 for its corresponding positioning lever 110. Immediately upon energization, the electromagnetic winding 121 neutralizes the permanent magnet 116 and leaf spring 115 rocks the bar positioning lever 110 to disengage the driving gear 112 from the rack teeth 86 on the type bar and engages the detent 114 with a particular notch 87 in the type bar, see FIGURE 15. Each selected type bar 80 is moved in this manner to a selected position as instructed by the data processing unit 6 where it is locked for a printing operation as indicated by portion O₂ of graph O.

During the initial operation of the selection shaft 15, a cam 228 on said shaft, see FIGURE 28, operates the lever 225 to feed the record proof tape Tp from an observation station S1 at the top of the platen 27 to a printing position at the underside of the platen as indicated by graph P of the chart in FIGURE 36. Lever 225 is then locked in this position by the engagement of the latch 230 with the shoulder 231. When the operation of the selection shaft 15 is completed, a select complete signal is produced, see FIGURE 9, as shown in the graph Q in FIGURE 36. Arm 215 moves the tape Tp rearwardly a distance of one line space less than the tape is advanced by the gainer mechanism illustrated in FIGURE 29.

The printer is then in condition to print on both the bank book Bk and record tape Tp. A cam 75 on selection shaft 15, see FIGURE 10, then actuates the switch 73 to deliver a print signal at the time indicated by the plot R in FIGURE 36 if all bars are properly adjusted. The chart in FIGURE 37 lags the chart in FIGURE 36 by the rotation of the selection shaft 15 through one revolution so that the signal shown at the end of plot R in FIGURE 36 is the same signal shown at the beginning of graph R in FIGURE 37. The electric signal releases the clutch 51 for connecting the print shaft 16 in the manner described with respect to the selection shaft 15, see FIGURES 6 to 8. Operation of the pawl 59' of the clutch 41 initiates operation of the print shaft, as shown in graph S, and actuates the interlock bar 66 in the opposite direction as indicated by the graph T in FIGURE 37.

Rotation of the print shaft 16 operates through eccentric pins 199 at its ends to move the frame links 198 downwardly, see FIGURE 27, to press the platen 27 and proof tape Tp toward the print bars 80 at the printing station. This causes the type characters 84 on the bars 80 to imprint an impression through the ribbon 33 onto the record tape at the time period indicated by the graph U in FIGURE 37. Print shaft 16 acting through the cam 184, see FIGURE 26, actuating arm 181 and print arm 176 to move the anvil 175 and bank book Bk toward the type characters 85 on the underside of bars 80 to make an impression through the ribbon 33 onto the bank book as indicated by the graph V in FIGURE 37.

Adjacent the end of one revolution of the print shaft 16, the cam 64, see FIGURES 3 and 26, on the shaft actuates the follower arm 65 to oscillate the bail shaft 31 at the time indicated by graph W. Oscillation of the bail shaft 31 operates through the link 242, see FIGURE 30, to rock the general bail 235 and thereby moves all of the bar positioning levers 110 for the plurality of type bars 80 back to the initial position illustrated in FIGURE 12 for the next printing operation.

Figure 37:
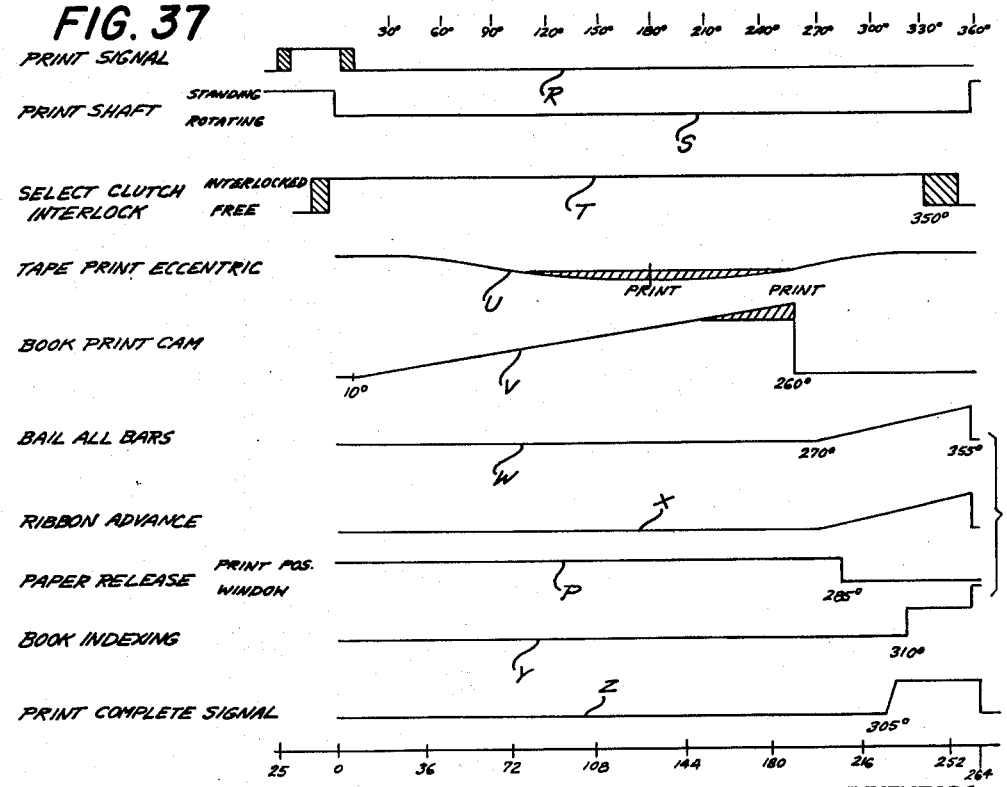
FIGURE 37 is a timing chart showing the time relation of the elements operated by the print shaft.

Oscillation of the bail shaft 31 also actuates the bar 280, see FIGURES 3 and 33, to advance the print ribbon 33 and this motion of the ribbon is indicated by the graph X in FIGURE 37.

It will also be observed that the actuation of the bail link 242, see FIGURE 30, by the bail shaft 31, releases the latch 230 from engagement with lever 225 for operating the tape feed mechanism at the time indicated by the graph P in FIGURE 37. The spring pressed rod 227 then actuates the lever 225 and the driving mechanism 29 to move the proof tape from the printing station S2 to the observation station S1.

Furthermore, the cam 172, see FIGURE 25, on the bail shaft 31 oscillates the pawls 152 and 153 to advance the carriage 25 a distance of one line as indicated by the graph Y in FIGURE 37. Upon completion of a printing operation, the cam 76 on the printing shaft 16, see FIGURE 10, closes switch 78 to produce a printing complete signal on the graph Z on FIGURE 37. This completes one complete cycle of the printer.

Following the printing of the amount on the bank book Bk, the data processing apparatus 6 instructs the printer 4 to print the new total. This instruction is transmitted by signals through the cable 7 to the printer 4 which operates in the same way to print the new balance. Upon a signal from the data processing unit 6 the electromagnetic winding 262 is energized, see FIGURE 30, which operates through the springs 256 to actuate the balance bail 237 to restore the print bars 80 in the balance group to their initial position.

Other operations of withdrawing sums or adding interest are performed in the same general way to add or subtract from the balance in the memory of the data processing unit 6, and print the amount on the bank book Bk and tape Tp and the new balance when so instructed.

While a single embodiment of the invention is herein illustrated and described, it will be understood that changes may be made in the construction and arrangement of elements without departing from the spirit or scope of the invention. Therefore, without limitation in this respect, the invention is defined by the following claims.

What is claimed is:

1. In a printer for printing digital information in different columns on both a flat record sheet and continuous proof tape in which a type element is provided for each of the different columns to be printed, selection means for moving each type element relative to a printing station, ink transfer means between the type elements, record sheet and proof tape, and platens at opposite sides of the type elements, the combination with said elements of type elements in the form of bars having an end section with type characters projecting from its opposite edges, an intermediate section having rack teeth and an opposite end section with detent notches in its edge, a pivoted rocker for each type element having a spur gear at one end in meshing engagement with the rack teeth on the bar and a detent on its opposite end for engagement with the detent notches, means including a permanent magnet for each type element, an armature and stop connected in parallel in the magentic field of said permanent magnet, said armature being connected to actuate the rocker to one position for moving the spur gear into meshing engagement with the rack teeth on its type element, a spring for actuating the rocker in the opposite direction to disengage the spur gear and engage the detent with a notch, a magnetic winding for opposing the permanent magnet when energized, a magnetic shunt in parallel with the armature and having a gap therein to maintain a path for magnetic flux when the armature is moved away from its stop, means for feeding the record tape comprising cylindrical rolls for driving the tape in opposite directions from an observation station to a printing station and then back to the observation station, a gainer mechanism comprising a ratchet and pawl for advancing the tape one line space after each printing operation, a selection shaft connected to rotate the spur gears on the rockers and feed roll for driving the record tape from the observation station to the printing station, switch means operated by the movement of each type element to energize the magnetic winding for its magnet, a carriage for mounting a record sheet for movement relative to the printing station, a print shaft connected to operate the platens toward and away from the type elements, a motion transfer member between the print shaft and platen for the record sheet for controlling the movement of the platen toward the printing elements, means on the carriage for controlling the motion transfer member, means for indexing the carriage a distance of one line to be printed after each printing operation, means operated by the print shaft for operating the carriage indexing mechanism, a prime mover, clutches for connecting the prime mover to the selection shaft and print shaft, respectively, and an interlock connecting the clutches to prevent simultaneous operation of both shafts.

2. In a printer for printing digital information in different columns in which a type element is provided for each of the columns to be printed, each of said type elements having a type character for each digit to be printed and gear teeth projecting therefrom, a pivotally mounted rocker for each type element having a spur gear for meshing engagement with the teeth on its element, and means driving the spur gears on the rockers for the plurality of type elements to move the elements to adjusted position, the combination with said elements of means to actuate each rocker comprising a permanent magnet, a magnet armature connected to each rocker to hold its spur gear engaged with the rack teeth, a spring acting on each rocker to move the spur gear out of engagement with the gear teeth on its type element, and a magnetic winding for each magnet and opposing the latter when energized whereby to adapt each spring to actuate its rocker and disengage its type element when the latter is moved to a predetermined position.

3. A printer in accordance with claim 2 in which a selective switch is provided for each type element, said switch having a contact for each character on the printing element, and said contacts being connected to energize the magnetic winding.

4. A printer in accordance with claim 2 in which the permanent magnet is in the form of a bar, the armature comprising a movable bar and stop adapted to engage each other, and a magnetic bar in parallel with the permanent magnet and armature and providing a magnetic shunt.

5. A printer in accordance with claim 4 in which the magnetic shunt has an air gap to produce a greater reluctance than the armature and stop when engaged.

6. A printer in accordance with claim 2 in which the permanent magnets for the plurality of type elements are connected in a bank between upper and lower magnetic plates, and a magnetic armature and shunt bar for each rocker arm arranged in parallel between said plates whereby to tend to equalize the loading required on each magnetic winding to release its armature when different numbers of armatures have been released.

7. In a printer for printing digital information in different columns on both a flat record sheet and continuous proof tape in which a type element is provided for each of the different columns to be printed, each of said type elements being in the form of a bar and having corresponding type characters for each digit at opposite sides thereof, means for mounting the type bars for sliding movement in fixed paths longitudinally thereof, selection means for moving each type bar relative to a printing station to position particular type characters on the different bars at a printing position, and platens located at the same printing position at opposite sides of the type bars, the combination with said type bars of means for pivotally mounting said platens for swinging movement toward said bars at opposite sides thereof for pressing the record sheet and proof tape between the platens and elements to imprint digital information on the sheet and tape and away from said printing elements to release the sheet and tape, a print shaft, cams on the print shaft and connected to move the platen toward the type bars, and the cams on the print shaft being so arranged as to first move one platen toward the type bars while the other platen is moving away from the bars and then move said other platen toward the type bars as the first platen moves away from the bars, means for stopping the print shaft at an intermediate position where both platens are spaced from the print bars, and a prime mover connected to operate the selection means and print shaft in sequential order, to first move the type bars to adjusted position relative to each other and then move the platens toward the type bars in sequential order.

8. A printer in accordance with claim 7 in which the platen for the proof tape is in the form of a roll, means for mounting the roll for rotating the record tape from a printing station to an observation station, and a gainer mechanism for advancing the platen one printing line after each printing operation comprising a gear on the platen roll, a reciprocating rack for meshing engagement with the gear, and means for lifting the rack during reciprocation in one direction.

9. In a printer for printing digital information in adjacent columns in which type elements are provided in each column to be printed having type faces for each character, a platen roll mounted for movement toward and away from said type elements, a proof tape extending between supply and take up reels and having a loop extending over the platen roll, means for reciprocating the platen roll toward and away from the type elements to produce an impression from the type elements on the proof tape, means for moving the proof tape from an observation station above the platen roll to a printing station under the platen roll before each printing operation and returning the tape from the printing station to the observation station after each printing operation, the combination with said elements of a gainer mechanism for advancing the tape one line after a printing operation comprising a gear on the platen roll, a ratch adjacent the gear, a rack bar having teeth meshing with the gear and a pawl engaging the ratch, said pawl engaging the ratch to lift the rack out of engagement with the gear and advance the platen roll one line when the rack bar is moved in one direction, and means for reciprocating the rack bar through a fixed stroke whereby to move the platen roll by the rack bar and pawl through a forward stroke and by the rack bar only during the return stroke of the bar.

10. A printer in accordance with claim 9 in which a driving roll is provided beyond the observation station for positively moving the tape from the printing station to the observation station, a gear on the driving roll, a rack for driving the gear and roll, and the means for reciprocating the first rack bar through a fixed stroke is an oscillating arm to which the ends of both rack bars are pivotally connected.

11. A printer in accordance with claim 10 in which a back-up roll is provided at one side of the driving roll and between which the proof tape extends, said driving roll being moved toward the back-up roll upon movement of the rack bar in one direction and away from the back-up roll during movement of the rack bar in the opposite direction, a take-up reel mounted adjacent the driving roll, pulleys on the reel and driving roll, and a sliping belt between the pulleys for rotating the take-up reel from the driving roll.

12. A printer in accordance with claim 9 in which pivoted arms are mounted between a supply reel and platen roll and between the driving roll and take-up reel, and springs tending to rock the arms to take-up the slack in the tape as it moves in the opposite direction.

13. In a printer for printing digital information in different columns on a flat record sheet in which a type element is provided for each of the different columns to be printed, type faces for each character to be printed projecting from one edge of each type element, selection means for moving each type element relative to a printing station to position particular type faces on the different elements at a printing position, a carriage for mounting a record sheet for sliding movement through the printing station, the combination with said elements of a press means comprising a platen underlying the flat record sheet mounted on the carriage, said platen being mounted for movement toward and away from the type elements, driving means comprising a print shaft having a cam thereon positioned adjacent the platen, motion transfer means having a member positioned directly between the cam and platen to provide a connection therebetween, and means for operating the motion transfer means to withdraw the member from between the cam and platen whereby to control operation of the press.

14. A printer in accordance with claim 13 in which the flat record sheet is a bank book adapted to be mounted on the carriage, and a lug on the carriage for engaging and actuating the motion transfer means to withdraw the member from between the cam and platen whereby to prevent operation when the carriage is in an inoperative position.

15. A printer in accordance with claim 14 in which the motion transfer means comprises a bell crank lever having an end engaged by the lug on the carriage, and the other end being pivotally connected to the member between the platen and cam on the print shaft.

16. In a printer for printing digital information in adjacent columns in which elongated type bars of arcuate shape are provided having convex and concave edges at opposite sides with type faces at said opposite sides for each character to be printed, said bars being mounted for sliding movement in abutting side by side relationship, selection means for moving the type bars to particular positions relative to each other, means for mounting a sheet and proof tape to be printed, platens at opposite sides of the type bars mounted for movement toward the type elements for pressing the record sheet and proof tape therebetween and away from the type elements to release the sheet and tape, the combination with said type bars of means pivotally mounting the platens for rocking movement toward the type bars, a print shaft, a cam on the print shaft connected to rock the platen for the record sheet, eccentrics on the print shaft, links connected between the eccentrics and platen for the proof tape to rock the latter toward the type elements, the cams and eccentrics on the print shaft being so arranged as to first rock one platen toward the type bars while the other platen is moving away from the bars and then move said other platen toward the type bars as the first platen moves away from the bars whereby rotation of the print shaft through one revolution operates both of said platens sequentially, and means for stopping said print shaft at an intermediate position where both platens are spaced from the print bars.

17. A printer in accordance with claim 16 in which the platen for the proof tape is in the form of a roll, links for rotatably mounting the opposite ends of the platen roll for movement toward and away from the type elements, and the links between the eccentrics and platen roll being journaled to the roll.

18. In a printer for printing digital information in different columns on a flat record sheet in which a type element is provided for each of the different columns to be printed, a type face for each character to be printed projecting from one edge of the type element, selection means for moving each type element relative to a printing station to position particular type faces on the different elements at a printing position, and a carriage for mounting a record sheet for sliding movement through the printing station, the combination with said elements of indexing means for advancing the carriage in measured increments corresponding to one line space of the printed lines comprising a spring for moving the carriage in one direction, a series of detent teeth on said carriage and spaced apart a distance equal to the spacing of a line of printing, separate pawls spaced apart less than the distance between adjacent detent teeth, and driving means connected to operate the plurality of pawls successively to release the carriage for advancement through a distance of one detent tooth by the spring.

19. A printer in accordance with claim 18 in which manually operable means is provided for releasing the detent pawls comprising a release bar mounted on the carriage to overlie the spaced detents and having inclined slots, pins projecting from the carriage through the inclined slots in the release bar, a spring acting on the release bar to move it in one direction and upwardly with respect to the pawls, and a handle for sliding the release bar in the opposite direction and downwardly to actuate the pawls from engagement with the detents.

20. In a printer for printing digital information in different columns on a flat sheet in which a type element is provided for each of the different columns to be printed, each type element having a type character for each digit to be printed projecting from one edge, selection means for moving each type element relative to a printing station to position particular type characters on the different elements in line at the printing station, impression means on at least one side of the type elements, a shaft connected to operate the selection means, a separate shaft for relatively moving the impression means and type elements to press a record sheet therebetween, and a prime mover, the combination with said elements of separate clutches for connecting the shafts to the prime mover, and interlocking means between clutches to prevent operation of each shaft when the other is connected to the prime mover.

21. A printer in accordance with claim 20 in which each clutch comprises a wrap around spring which is disengaged when one end of the spring is held and engaged when the end of the spring is released, a pivoted control arm for each clutch which holds and releases the end of the spring, means for rocking each arm from a holding to a releasing position, and the interlocking means comprising a bar connecting the two arms to prevent operation of one arm to releasing position until the other arm has been moved to a holding position.

22. A printer in accordance with claim 21 in which a cam is provided on at least one of the shafts and having a lobe with an apex, and a spring pressed arm having a roller at one end bearing against said cam whereby to move the shaft through a small angular increment of movement after its clutch has been initially operated to insure complete disengagement of the clutch.

23. A printer in accordance with claim 21 in which the means for rocking each clutch arm is an electromagnet, a cam on the shaft for operating the selection means, a movable cam follower operated by the cam adjacent the end of its cycle, and means including a switch operated by the movable cam follower to energize the electromagnet for releasing the clutch to initiate operation of the impression means.

References Cited in the file of this patent
UNITED STATES PATENTS

| | | |
|---|---|---|
| 1,198,492 | Von Pein | Sept. 19, 1916 |
| 1,957,193 | Armbruster | May 1, 1934 |
| 2,616,623 | Goodbar et al. | Nov. 4, 1952 |